US012297662B2

(12) United States Patent
Lin et al.

(10) Patent No.: US 12,297,662 B2
(45) Date of Patent: May 13, 2025

(54) SUPPORT STRUCTURE FOR HANDLE ASSEMBLY

(71) Applicant: ASSA ABLOY Americas Residential Inc., New Haven, CT (US)

(72) Inventors: James Lin, Laguna Niguel, CA (US); Mark Bloom, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 361 days.

(21) Appl. No.: 17/429,862

(22) PCT Filed: Feb. 5, 2020

(86) PCT No.: PCT/US2020/016800

§ 371 (c)(1),
(2) Date: Aug. 10, 2021

(87) PCT Pub. No.: WO2020/167553

PCT Pub. Date: Aug. 20, 2020

(65) Prior Publication Data

US 2022/0205278 A1 Jun. 30, 2022

Related U.S. Application Data

(60) Provisional application No. 62/803,991, filed on Feb. 11, 2019.

(51) Int. Cl.
*E05B 55/00* (2006.01)
*E05B 13/10* (2006.01)
*E05B 3/00* (2006.01)

(52) U.S. Cl.
CPC .......... *E05B 55/005* (2013.01); *E05B 13/108* (2013.01); *E05B 3/003* (2013.01)

(58) Field of Classification Search
CPC ... E05B 3/003; E05B 3/04; E05B 3/10; E05B 2003/006; E05B 13/004; E05B 55/005; E05B 13/108
See application file for complete search history.

(56) References Cited

U.S. PATENT DOCUMENTS 2,062,765 A * 12/1936 Schlage .................. E05B 3/003 292/352
2,301,751 A 11/1942 Schlage
(Continued)

FOREIGN PATENT DOCUMENTS

CN 2362993 Y 2/2000
CN 2565906 Y 8/2003
(Continued)

OTHER PUBLICATIONS

International Search Report and Written Opinion for PCT/US2020/016800, May 18, 2020.
(Continued)

*Primary Examiner* — Nicholas L Foster
*Assistant Examiner* — Noah Horowitz
(74) *Attorney, Agent, or Firm* — Merchant & Gould P.C.

(57) ABSTRACT

A handle assembly includes a removable handle positioned over a sleeve. The handle assembly includes a catch positioned within the sleeve, and when extended, the catch prevents relative movement between the handle and the sleeve. The handle assembly includes a spindle positioned within the sleeve. The spindle has a longitudinal axis. The spindle is rotatable between a locked position and an unlocked position. When in the locked position, the sleeve is not rotatable, and when in the unlocked position, the sleeve is rotatable. The handle assembly includes a support structure that is configured to support the spindle. The support structure is in a fixed rotational relationship with respect to the handle. When the catch is in an extended
(Continued)

position and the spindle is in the locked position, deflection of the spindle in a direction transverse to the longitudinal axis is resisted by way of the support structure.

21 Claims, 24 Drawing Sheets

(56) References Cited

U.S. PATENT DOCUMENTS 2,976,073 A * 3/1961 Russell .................... E05B 3/003 292/347
3,212,306 A * 10/1965 Russell .................... E05B 3/003 292/352
3,467,429 A * 9/1969 Armstrong .............. E05B 3/003 292/352
3,800,573 A 4/1974 Babb, Jr. et al.
4,195,502 A 4/1980 Best et al.
4,201,069 A 5/1980 Katayama et al.
4,394,821 A * 7/1983 Best .................... E05B 17/0058 70/381
4,550,581 A * 11/1985 Best .................... E05B 17/0058 70/422
5,074,607 A 12/1991 Lin
5,077,994 A * 1/1992 Trull ........................ E05B 9/084 70/371
5,113,675 A 5/1992 Uyeda
5,177,987 A 1/1993 Shen
5,598,726 A 2/1997 Cordle
5,782,119 A 7/1998 Ellis et al.
5,784,909 A 7/1998 Huang
5,927,777 A 7/1999 Kuo et al.
6,279,360 B1 8/2001 Shen
6,536,249 B2 3/2003 Wu
6,543,265 B1 4/2003 Fan
6,615,630 B2 9/2003 Wu et al.
6,807,833 B1 10/2004 Huang et al.
6,860,529 B2 3/2005 Chong et al.
6,929,290 B2 8/2005 Don
6,935,148 B2 8/2005 Don
6,993,945 B1 2/2006 Chen
7,100,407 B2 9/2006 Chen
7,156,432 B2 * 1/2007 Sledge .................... E05B 3/003 292/DIG. 64
7,472,571 B1 * 1/2009 Chang ................. E05B 47/0673 70/222
7,559,219 B2 7/2009 Chen
7,581,421 B2 * 9/2009 Don .......................... E05B 3/00 292/355
8,087,273 B2 1/2012 Liu et al.
8,201,307 B2 6/2012 Romero
8,505,345 B2 8/2013 Sun et al.
10,724,272 B2 * 7/2020 Cohen ..................... E05B 55/06
2003/0056556 A1 3/2003 Park et al.
2007/0182169 A1 8/2007 Fang et al.
2008/0072634 A1 3/2008 Don et al.
2008/0087051 A1 * 4/2008 Huang .................... E05B 3/003 70/91
2009/0008949 A1 * 1/2009 Lin ......................... E05B 3/003 292/336.3
2010/0064745 A1 3/2010 Liu et al.
2014/0196566 A1 * 7/2014 Hsieh ...................... E05B 3/003 74/548
2014/0290427 A1 10/2014 Huang et al.
2016/0130837 A1 * 5/2016 Chiou ................... E05B 1/0007 70/224

FOREIGN PATENT DOCUMENTS

CN 1242149 C 2/2006
CN 2921219 Y 7/2007
CN 203769437 U 8/2014
CN 104420729 A 3/2015
WO 2009032839 3/2009

OTHER PUBLICATIONS

PCT International Preliminary Report on Patentability in Application PCT/US2020/016800, mailed Aug. 26, 2021, 7 pages.

* cited by examiner

SUPPORT STRUCTURE FOR HANDLE ASSEMBLY

This application is a PCT International patent application No. PCT/US2020/016800, filed Feb. 5, 2020, which claims priority to U.S. Provisional Patent Application No. 62/803, 991, filed Feb. 11, 2019, which applications are incorporated herein by reference. To the extent appropriate, a claim of priority is made to each of the above-disclosed applications.

BACKGROUND

A handle assembly, typically on a door, is used to control access through the door. When installed on a door where keyed-lock security is desired, the handle assembly includes a space for accommodating a lock, such as a lock core, which is movably coupled to a spindle. The spindle is connected to a latch, and the spindle can operate the latch between a locked or an unlocked position. When in the locked position, the latch is locked in an extended position so that the door cooperates with a door frame to secure the door in a closed position and prevent retraction of the latch. When in the unlocked position, the latch can be moved to a retracted position by rotation of the handle and thereby allow relative movement between the door frame and the door.

A handle assembly typically includes a removable handle installed on a sleeve. The handle is removable from the sleeve to ease installation of the handle assembly, enable easy servicing of the handle assembly, and allow different handles to be installed on the sleeve. The handle is held in place on the sleeve by a catch. The catch can be accessed through a hole on the handle and depressed to release the handle from the sleeve only when the lock core in the handle assembly is unlocked. However, in some handle assemblies, brute force can be used to overcome the catch mechanism, even when the lock core of the handle assembly is in the locked position. This creates a security issue, as an unwanted user can remove the handle, which includes the lock core, and manipulate the internal components of the handle assembly to open the door. This tampering can be done without signs of excessive force being used.

Therefore, improvements in handle assemblies are needed.

SUMMARY

The present disclosure relates generally to a handle assembly. In one possible configuration, and by non-limiting example, the handle assembly includes a support structure that is configured to resist forced removal of a handle from the handle assembly.

In one aspect of the present disclosure, a handle assembly is disclosed. The handle assembly includes a removable handle that includes a positioning hole. The handle assembly includes a lock core positioned within the handle. The handle assembly includes a sleeve sized and shaped to receive the handle therearound and the lock core at least partially therein. The handle assembly includes a catch positioned within the sleeve. The catch has an extended position and a retracted position. When in the extended position, a protrusion of the catch interfaces with a portion of the positioning hole of the handle so as to prevent relative movement between the handle and the sleeve. When in the retracted position, the handle is movable relative to the sleeve. The handle assembly includes a spindle positioned within the sleeve and connected to the lock core. The spindle has a longitudinal axis. The spindle is rotatable by the lock core between a locked position and an unlocked position. When in the locked position, the sleeve is not rotatable, and when in the unlocked position, the sleeve is rotatable. The handle assembly includes a support structure that is configured to support the spindle. The support structure is in a fixed rotational relationship with respect to the handle. When the catch is in the extended position and the spindle is in the locked position, deflection of the spindle in a direction transverse to the longitudinal axis is resisted by way of the support structure.

In another aspect of the present disclosure, a method of increasing the security of a handle assembly is disclosed. The method includes providing a handle assembly that includes a removable handle that includes a positioning hole. The handle assembly includes a lock core positioned within the handle, and the handle assembly includes a sleeve sized and shaped to receive the handle therearound and the lock core at least partially therein. The handle assembly includes a catch positioned within the sleeve. The catch has an extended position and a retracted position. When in the extended position, a protrusion of the catch interfaces with a portion of the positioning hole of the handle so as to prevent relative movement between the handle and the sleeve. When in the retracted position, the handle is movable relative to the sleeve. The handle assembly includes a spindle positioned within the sleeve and connected to the lock core. The spindle has a longitudinal axis, and the spindle is rotatable by the lock core between a locked position and an unlocked position. When in the locked position, the sleeve is not rotatable, and when in the unlocked position, the sleeve is rotatable. The method includes resisting deflection of the spindle transverse to the longitudinal axis of the spindle by way of a support structure when the catch is in the extended position and the spindle is in the locked position. The support structure is movable with respect to the spindle and the support structure is in a fixed rotational relationship with respect to the handle.

In another aspect of the present disclosure, a handle assembly is disclosed. The handle assembly includes a removable handle that includes a positioning hole. The handle assembly includes a lock core positioned within the handle, and the lock core includes a keyway at a first side and a spindle connector at an opposite, second side. The handle assembly includes a sleeve sized and shaped to receive the handle therearound and the lock core at least partially therein. The handle assembly includes a catch positioned within the sleeve. The catch has an extended position and a retracted position, and when in the extended position, a protrusion of the catch interfaces with a portion of the positioning hole of the handle so as to prevent relative movement between the handle and the sleeve. When in the retracted position, the handle is movable relative to the sleeve. The handle assembly includes a spindle positioned within the sleeve and connected to the spindle connector of the lock core. The spindle is rotatable by the lock core between a locked position and an unlocked position. When in the locked position, the sleeve is not rotatable, and when in the unlocked position, the sleeve is rotatable. The handle assembly includes a support structure that is configured to resist deflection of the spindle transverse to a longitudinal axis of the spindle when the catch is in the extended position and the spindle is in the locked position. The support structure is at least one of a blocking element of the sleeve or the spindle connector of the lock core.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
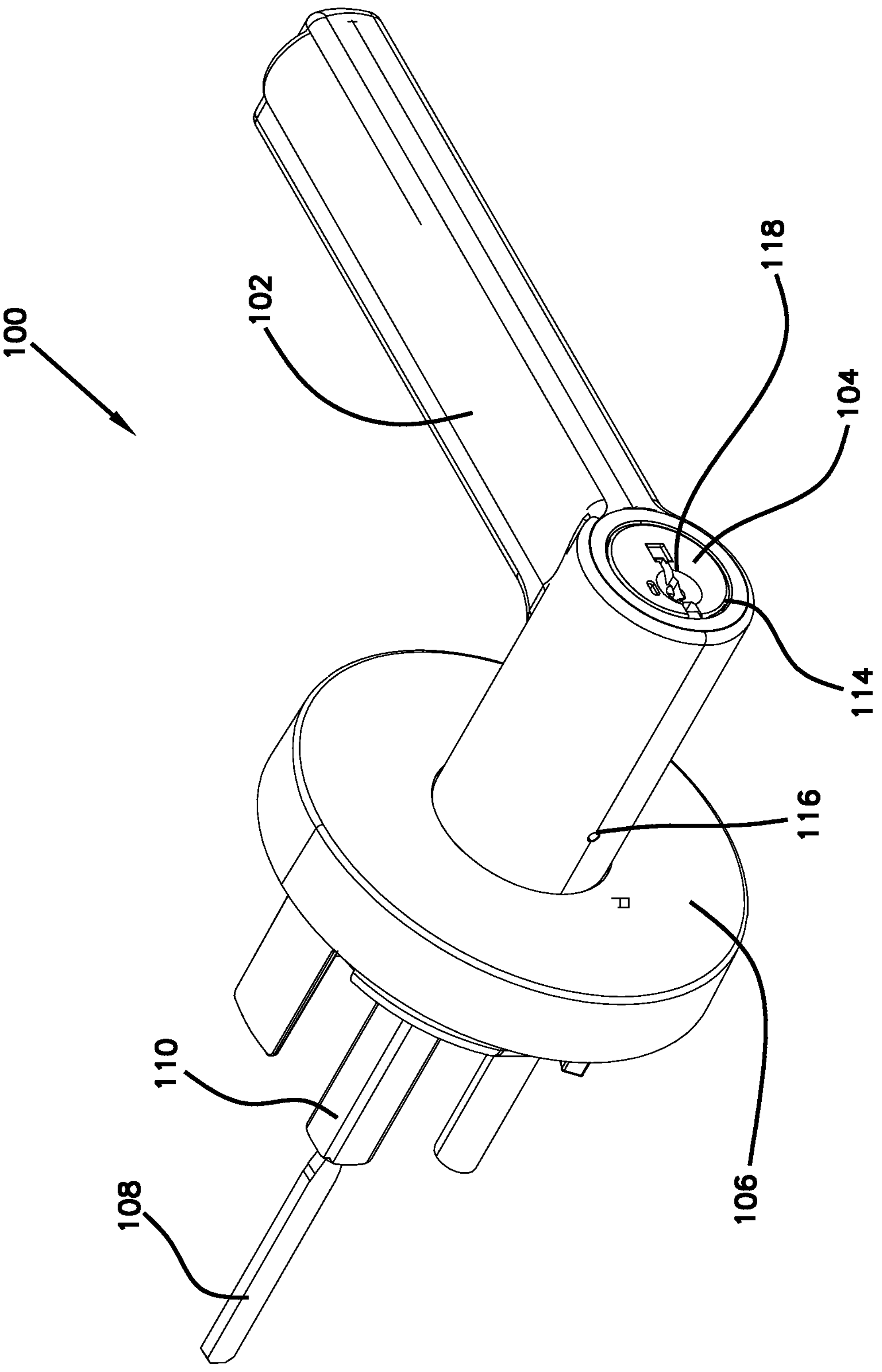
FIG. 1 illustrates a perspective view of a handle assembly, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to a support structure for a handle assembly. The support structure adds additional security to the handle assembly and resists unwanted tampering with the handle assembly. Such tampering is resisted by helping to prevent the handle, and lock core positioned therein, from being removed from the handle assembly when the handle assembly is in the locked position. The present disclosure includes a support structure that supports a spindle of the handle assembly when a lock core of the handle assembly is in the locked position. In some examples, the spindle is supported by way of a spindle connector that is connected to the lock core. By supporting the spindle, when an unwanted user exerts a force on a catch holding the handle on the handle assembly when the handle assembly is in the locked position, movement of the spindle is resisted and therefore movement of the catch is resisted and the handle remains secured to the handle assembly. In some examples, the support structure can prevent movement of the catch itself. In some examples, the support structure is integrated with a portion of the handle assembly, and, therefore, an additional part is not required. Thus, no further part cost is required thus reducing complexity of the handle assembly and improving the security of the handle assembly. In some examples, the support structure is in a fixed rotational relationship with handle. The support structure is not a ring that has a center hole disposed at the center where the hole is configured to pass the spindle therethrough.

Figure 2:
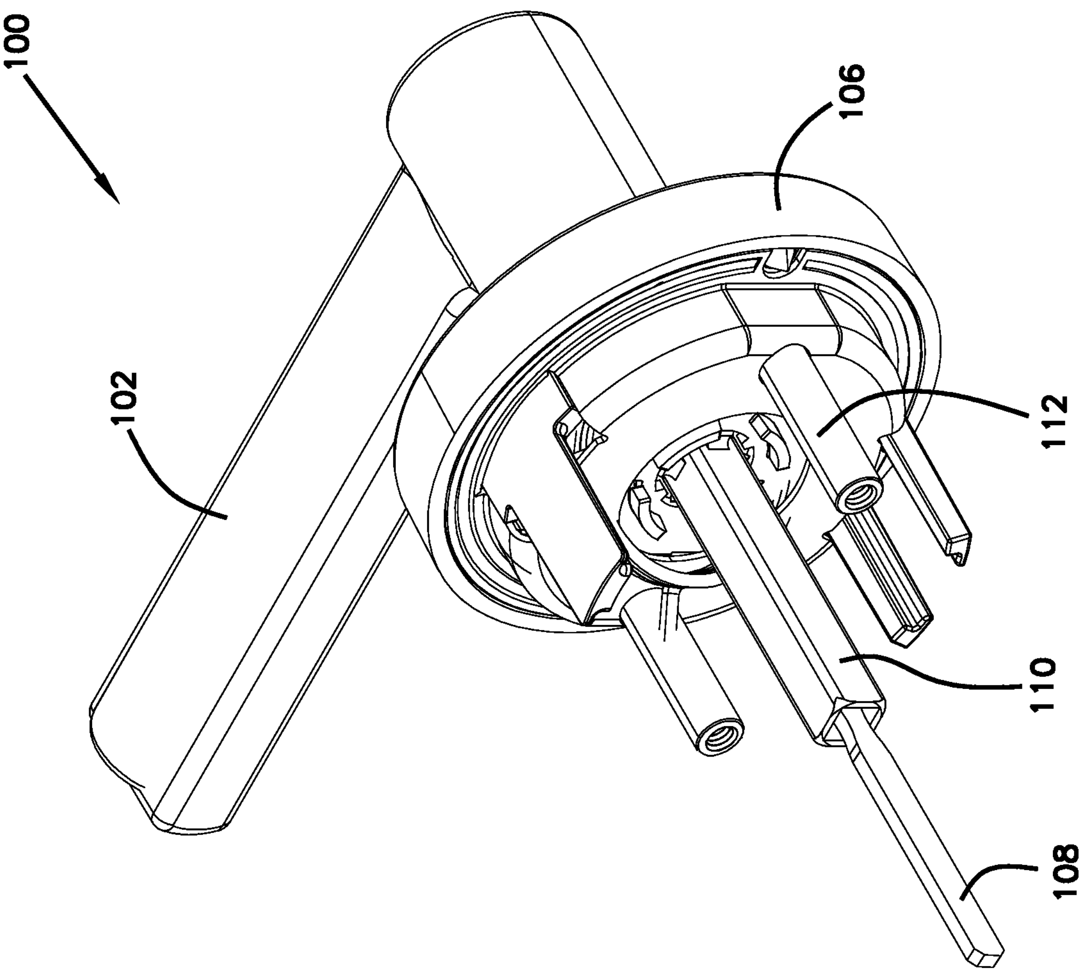
FIG. 2 illustrates another perspective view of a handle assembly, according to one embodiment of the present disclosure.

FIGS. 1 and 2 show perspective views of a handle assembly 100. In some examples, the handle assembly 100 is configured be installed on a door where a lock core 104 is desired. In some examples, the door can be an interior or exterior door. In some examples, the handle assembly 100 can be installed on a barrier other than a door, such has a gate, hatch, or the like.

As shown, the handle assembly 100 is configured to be mounted to an exterior side of a door. In some examples, the corresponding interior side of the door can include a door handle that has a lock operating apparatus, such as a thumb lock, that can be operated without the use of a key.

The handle assembly 100 includes a handle 102, the lock core 104, a rose 106, a spindle 108, a transmission element 110, and mounting elements 112.

The handle 102 can be sized and shaped in a variety of different ways so as to allow the user to interact with the handle assembly 100. For example, the handle 102 can be rotated by the user when the user interacts with the handle assembly 100 and can be biased to a default position via a spring. The handle 102 can be a knob, a lever, or the like. The handle 102 includes a central cavity 114 sized and shaped to receive the lock core 104. The central cavity 114 can include grooves and/or projections to receive corresponding grooves and/or projections of the lock core 104.

The handle 102 also includes a positioning hole 116. The positioning hole 116 is configured to allow the user to access portions of the handle assembly 100 to remove and secure the handle 102 to the handle assembly 102. In the depicted examples, the positioning hole 116 is positioned at a side of the handle 102. In other examples, the positioning hole can be positioned elsewhere on the handle 102.

The lock core 104 is positioned within the central cavity 114 of the handle 102. The lock core 104 is operable when a valid key is positioned, and rotated, within a keyway 118. In some examples, the lock core 104 can be rekeyable without removal of the lock core 104 from the central cavity 114 of the handle 102.

The rose 106 is configured to provide protection to the internal components of the handle assembly 100 while also providing the handle assembly 100 with a particular aesthetic. The rose 106 can be sized and shaped in a variety of different ways. In some examples, the rose 106 also includes a positioning hole that corresponds with the positioning hole 116 of the handle 102.

The spindle 108 is configured to be coupled to the lock core 104 and also facilitate locking and unlocking of the handle assembly 100. In some examples, the spindle 108 cooperates with a separate locking mechanism positioned at the handle assembly installed on the interior side of the door. In some examples, the spindle 108 interfaces with a latch in the door. The spindle 108 is moved between a locked position and an unlocked position by the lock core 104. Upon rotation of the handle 102, the spindle 108 is not rotated.

The transmission element 110 is configured to be rotated by the handle 102 when the handle assembly 100 is in the unlocked position. The transmission element 110 is configured to mate with the latch, which is installed in the door, to actuate the latch between an extended position, when the handle is not rotated, and a retracted position, when the handle 102 is rotated. In some examples, the spindle 108 is positioned within, and rotatable separately from, the transmission element 110.

The mounting elements 112 facilitate the mounting of the handle assembly 100 to an interior handle assembly. The mounting elements 112 can be configured to receive bolts from the interior side of the door. In some examples, the mounting elements 112 are configure to be positioned within a bore of the door.

Figure 3:
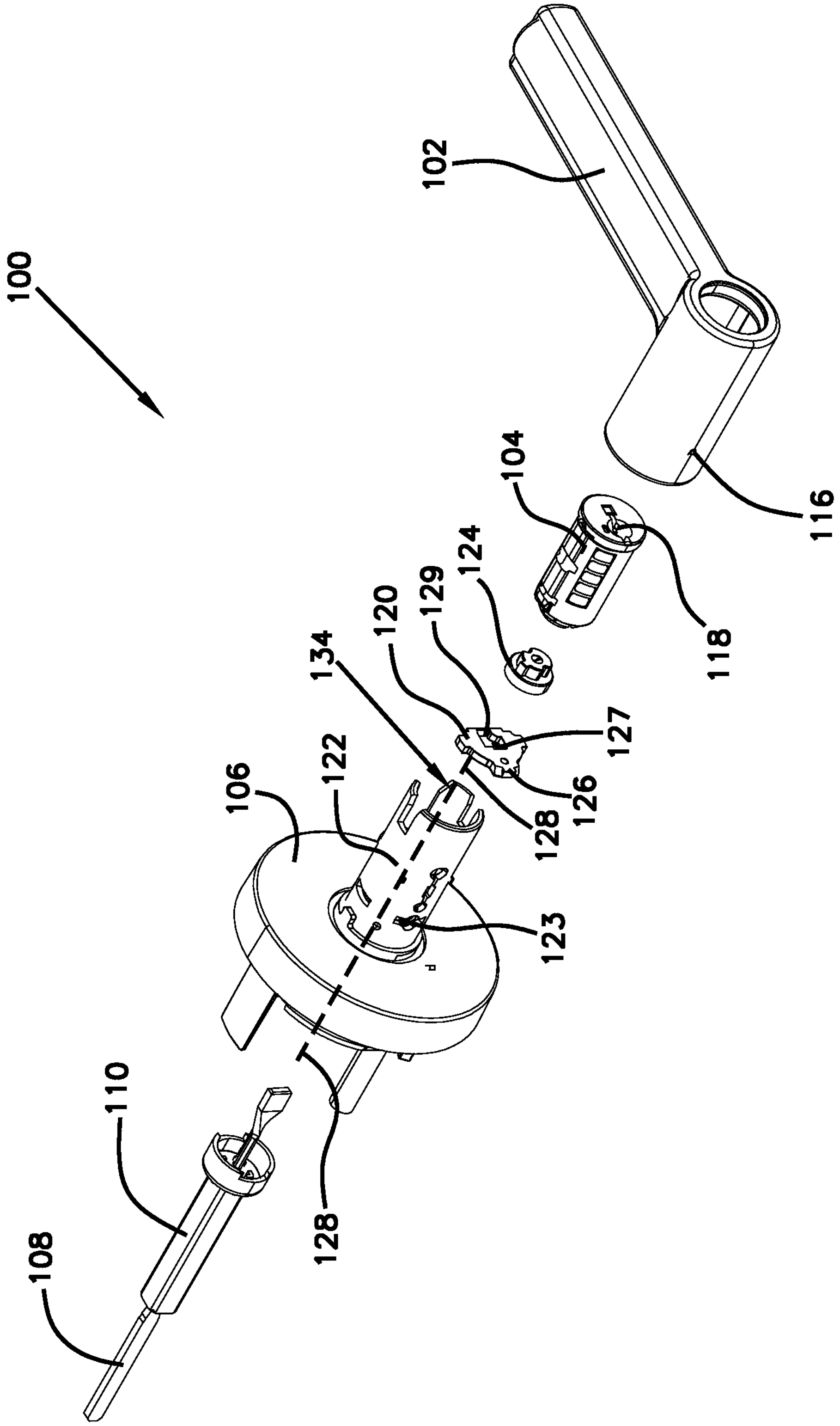
FIG. 3 illustrates a partial exploded view of the handle assembly of FIG. 1.

FIG. 3 shows a partial exploded view of the handle assembly 100. The handle assembly 100 further includes a catch 120 and a sleeve 122. Further, the lock core 104 is shown to include a spindle connector 124 that is connectable to the lock core 104 at an opposite side than the keyway 118.

The catch 120 is movably positioned within the sleeve 122, specifically a sleeve recess 123. The catch 120 is movable transverse to a longitudinal axis 128. In the depicted example, the catch 120 includes an aperture 127 that receives the spindle 108 therein. In some examples, the aperture 127 can include a bearing surface 129 therein.

The catch 120 is configured to be positioned in an extended position and interface with the handle 102 so as to secure the handle 102 onto the sleeve 122. When the catch 120 secures the handle 102 onto the sleeve 122, relative movement between the handle 102 and the sleeve 122 is prevented by the catch 120. Specifically, a projection 126 of the catch 120 interfaces with the positioning hole 116 of the handle 102.

When positioned in a retracted position, the catch 120 allows for relative movement between the sleeve 126 and the handle 102. This allows the handle 102 to be removed from the sleeve 122. In some examples, the catch 120 is biased toward the extended position. In some examples, the catch 120 is biased toward the extended position by way of a spring-like element.

The sleeve 122 is configured to interface with the transmission element 110 and the handle 102 so that the sleeve 122 transfers rotation from the handle 102 to the transmission element 110. This relationship allows rotation of the handle 102 of the handle assembly 100 to operate the latch, and thereby control the position of the latch between the extended and retracted positions. In some examples, the sleeve 122 can be manufactured using a progressive die. In some examples, the sleeve 122 is configured to receive the lock core 104 and spindle 108 therein. In further examples, the sleeve 122 is configured to support at least one of the catch 120 or spindle 110 in a direction transverse to the longitudinal axis 128.

The spindle connector 124 transfers rotation of the lock core 104 to the spindle 108. In some examples, only a limited amount of rotation of the lock core 104 is transferred to the spindle 108. In some examples, the spindle connector 124 is monolithically formed with the lock core 104. In other examples, the spindle connector 124 is fastened to the lock core 104.

Figure 4:
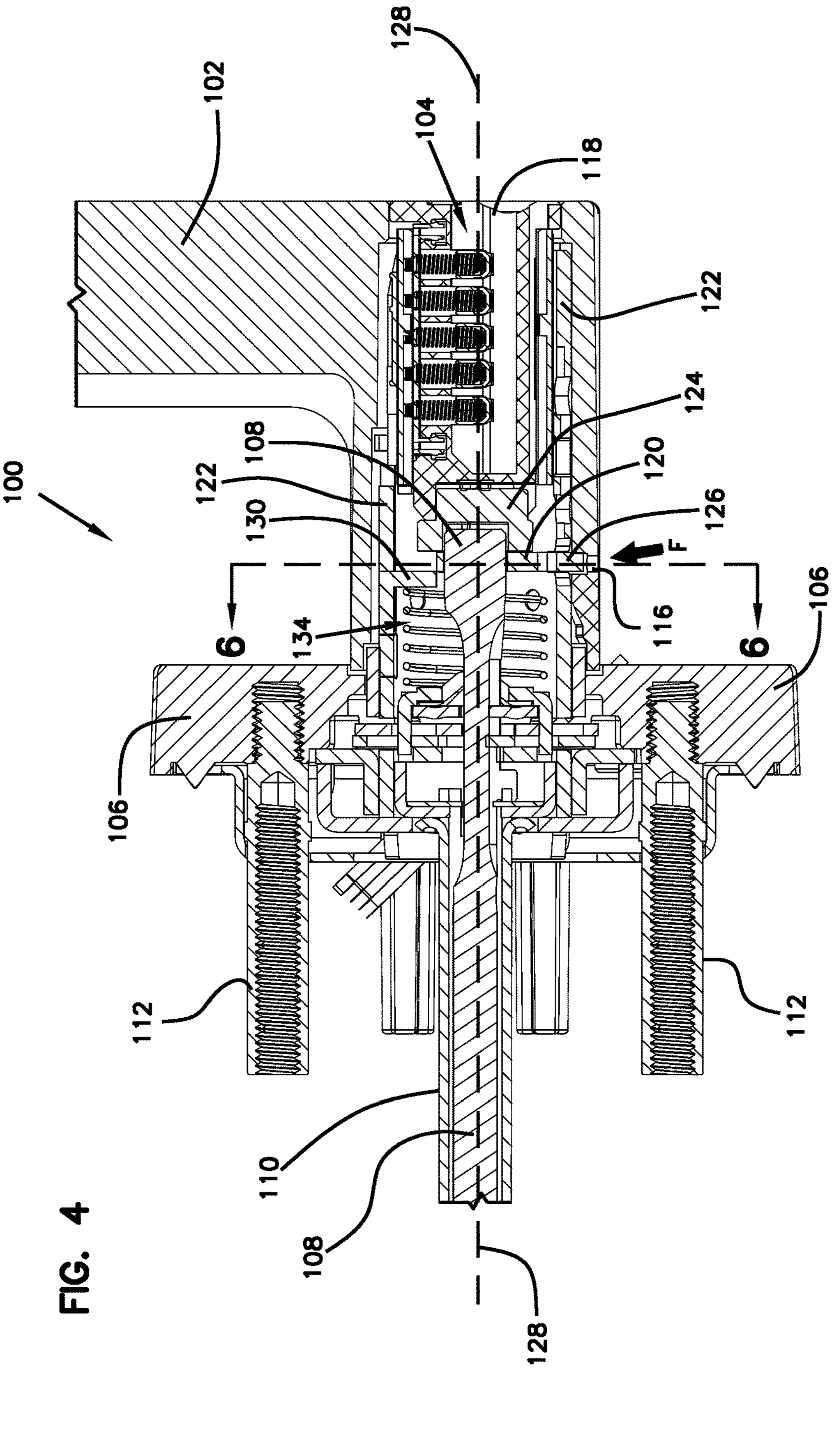
FIG. 4 illustrates a longitudinal cross sectional view of the handle assembly of FIG. 1 with a spindle in a locked position.
Figure 5:
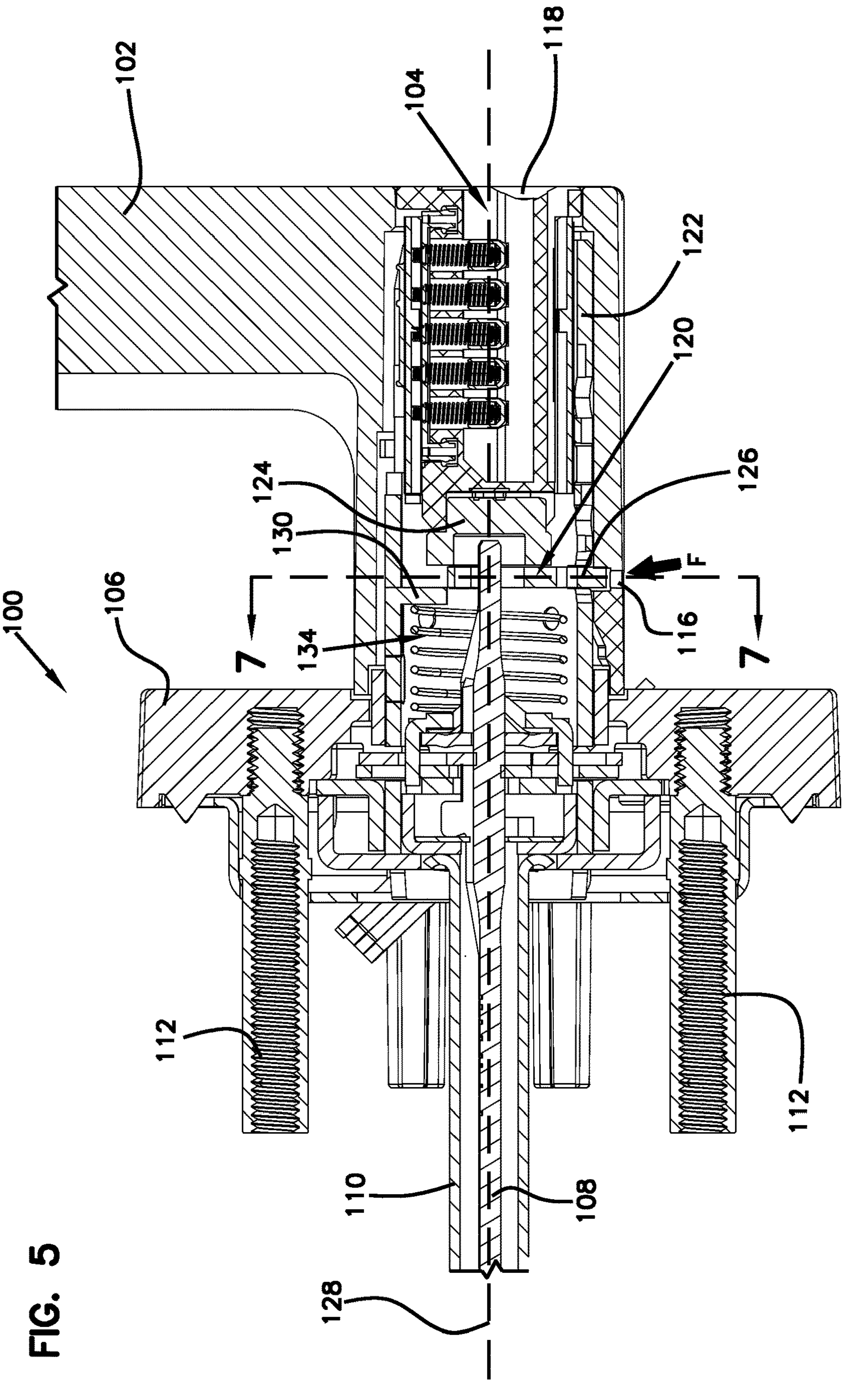
FIG. 5 illustrates a longitudinal cross sectional view of the handle assembly of FIG. 1 with the spindle in an unlocked position.
Figure 6:
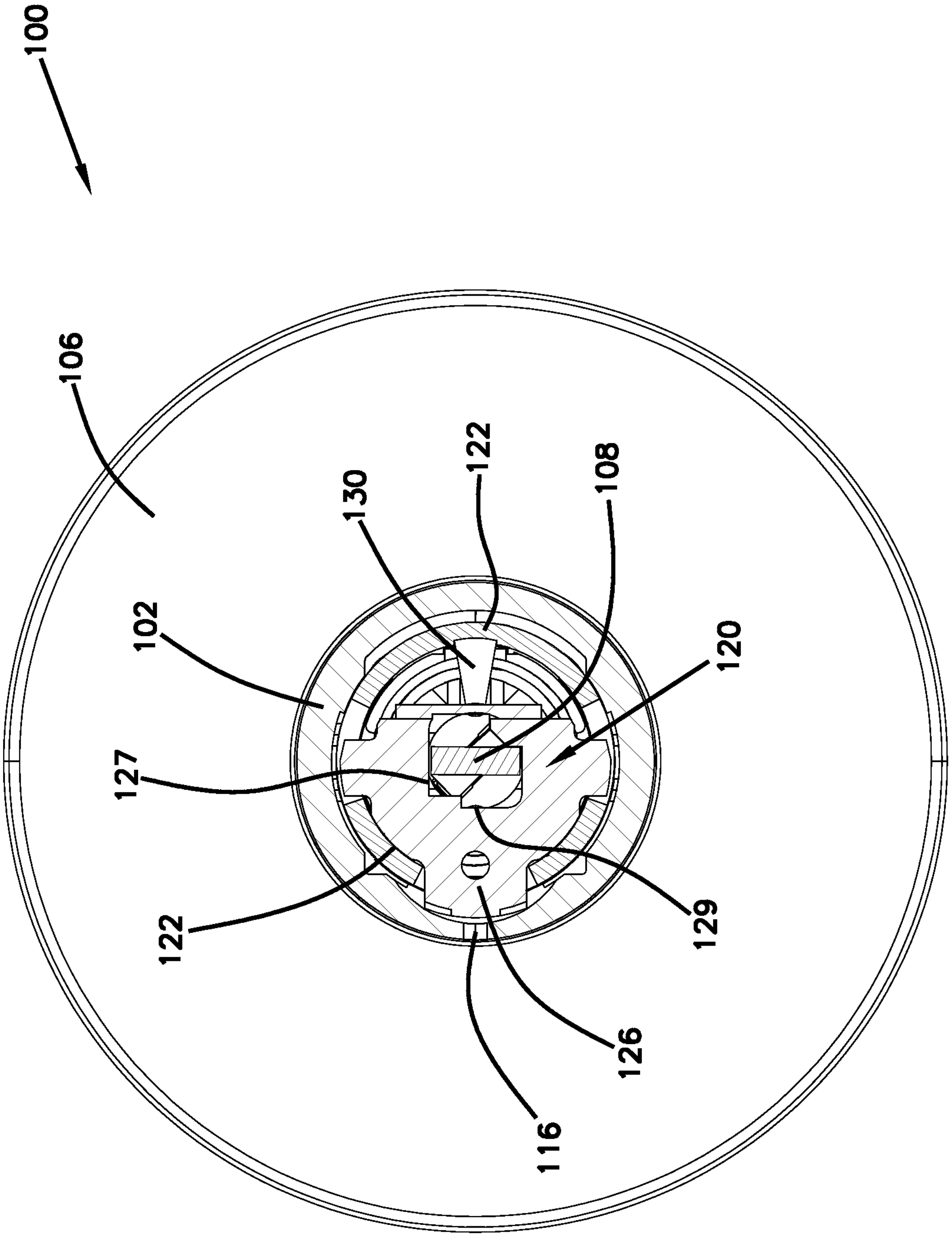
FIG. 6 illustrates a cross sectional view of the handle assembly along the line 6-6 in FIG. 4 with the spindle in the locked position.
Figure 7:
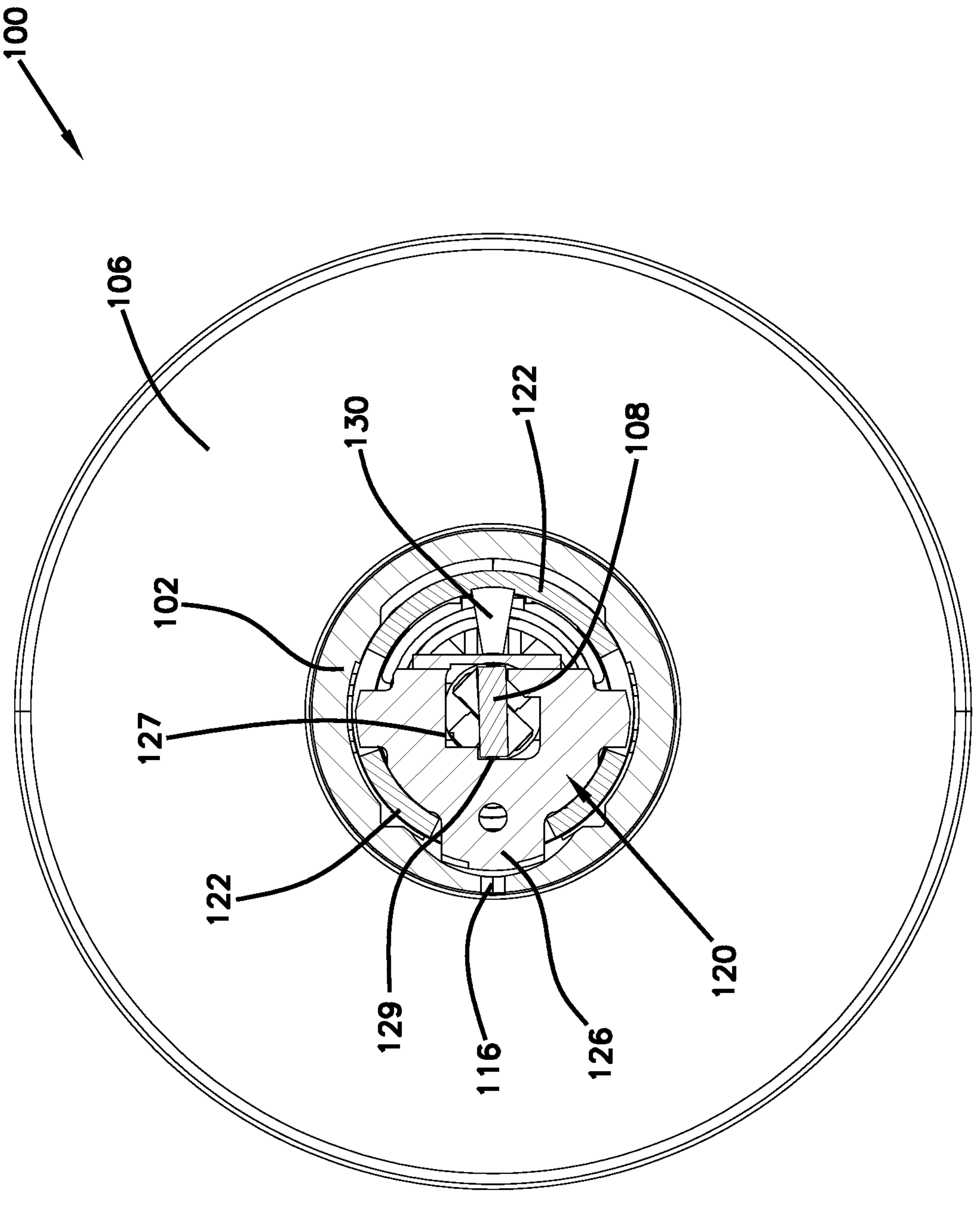
FIG. 7 illustrates a cross sectional view of the handle assembly along the line 7-7 in FIG. 5 with the spindle in the unlocked position.

FIGS. 4 and 5 show longitudinal cross sections of the handle assembly 100. FIG. 4 shows the spindle 108 in the locked position. FIG. 5 shows the spindle 108 in the unlocked position. As shown, the handle assembly 100 includes a support structure 130. FIG. 6 is a cross sectional view along line 6-6 of FIG. 4. FIG. 7 is a cross sectional view along line 7-7 of FIG. 5.

FIG. 4 shows the catch 120 in the extended position, with the protrusion 126 positioned within the positioning hole 116 of the handle 102. Because the spindle 108 is also in the locked position, the spindle 108 interfaces with the bearing surface 129 of the aperture 127 of the catch 120. To prevent unwanted movement of the spindle 108 transverse to the longitudinal axis 128, the support structure 130 is shown to support the spindle 108. In some examples, the support structure 130 supports the spindle connector 124.

In the depicted embodiments, the support structure 130 is integral with the sleeve 122 in the form of a blocking element/tab. In depicted example, the support structure 130 supports the spindle 108 when the spindle 108 is in the locked position. Such support resists an unwanted user from forcing the catch 120 toward the retracted (indicated by the arrow F) position by pressing on the catch 120 and deflecting the spindle 108. By not allowing the spindle to deflect, the catch 120 is prevented from moving to the retracted position and thus removal of the handle 102 from the sleeve 122 is prevented.

FIG. 5 shows the spindle 108 in the unlocked position. In the depicted example, the end of the spindle 108 has a blade-like construction. Therefore, when the spindle 108 is rotated to the unlocked position, the catch 120 can be moved to the retracted position because the spindle 108 does not interface with the bearing surface 129 of the aperture 127 of the catch 120 when the spindle 108 is in the unlocked position. Once moved to the retracted position, the protrusion 126 of the catch 120 is removed from interfacing with the handle 102.

Because of the construction of the spindle 108, the support structure 130 does not support the spindle 108 when the spindle 108 is in the unlocked position. Further, because the support structure 130 is integral in the sleeve 122, upon rotation of the sleeve 122 by the handle 102, the support structure 130 is rotatable relative to the spindle 108. Thus the support structure 130 is in a fixed rotational relationship with respect to the sleeve 122 and the handle 102.

Figure 9:
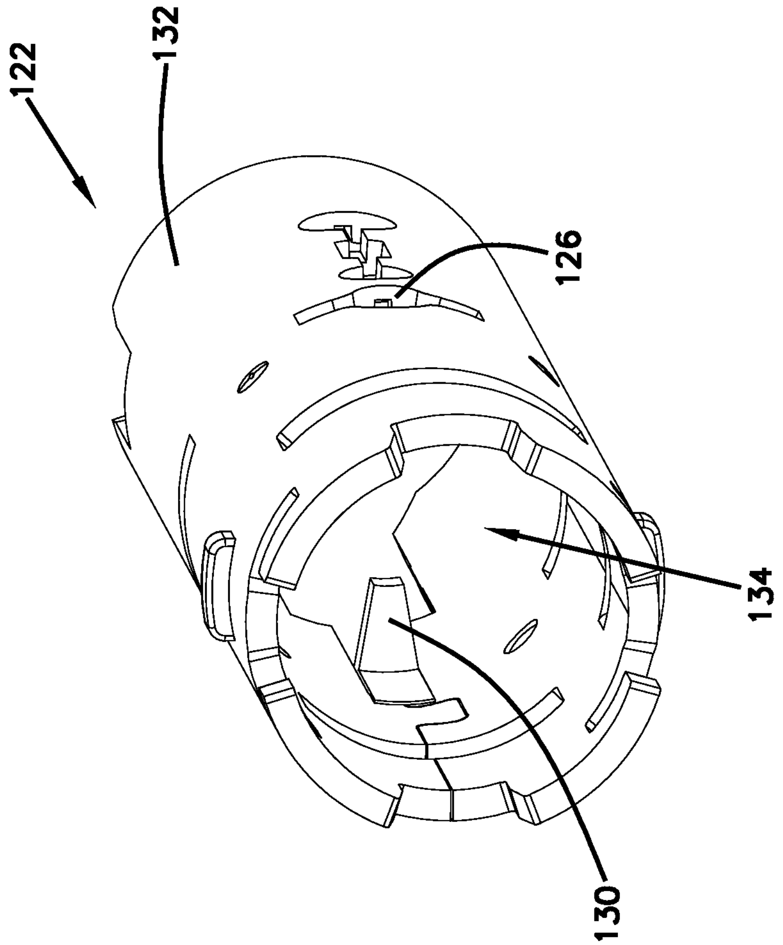
FIG. 9 illustrates another perspective view of a sleeve of the handle assembly of FIG. 3.
Figure 8:
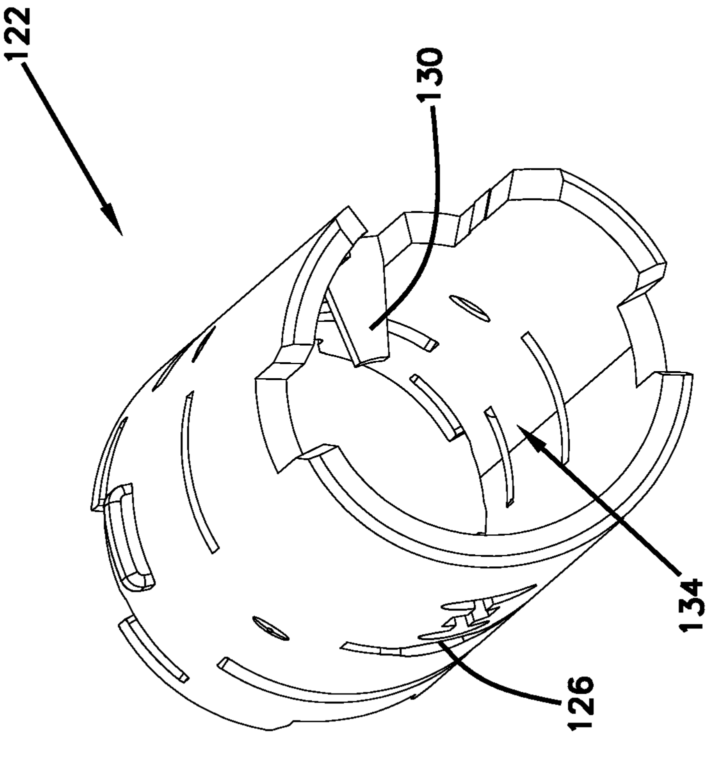
FIG. 8 illustrates a perspective view of a sleeve of the handle assembly of FIG. 3.
Figure 10:
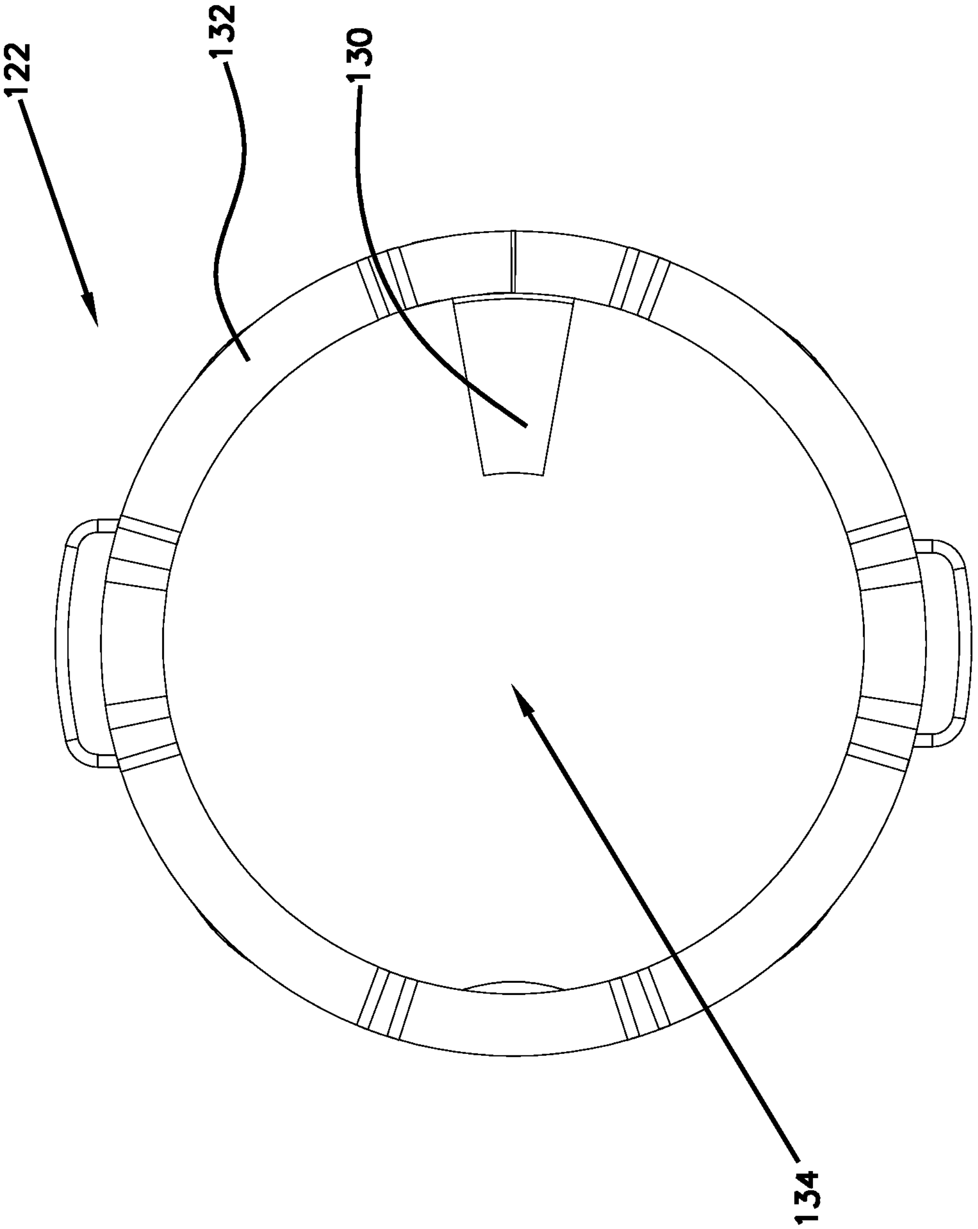
FIG. 10 illustrates an end view of a sleeve of the handle assembly of FIG. 3.

FIGS. 8 and 9 show perspective views of the sleeve 122. FIG. 10 shows an end view of the sleeve 122. As shown, the support structure 130 extends from a cylindrical wall 132 to an interior 134 of the sleeve 122. In some examples, the support structure 130 can be monolithically formed with the wall 132. In some examples, the support structure 130 can be fastened to the wall 132 by way of a fastener, weld, or the like. In some examples, the sleeve 122 is a multi-part sleeve including multiple portions that can be separable.

Figure 11:
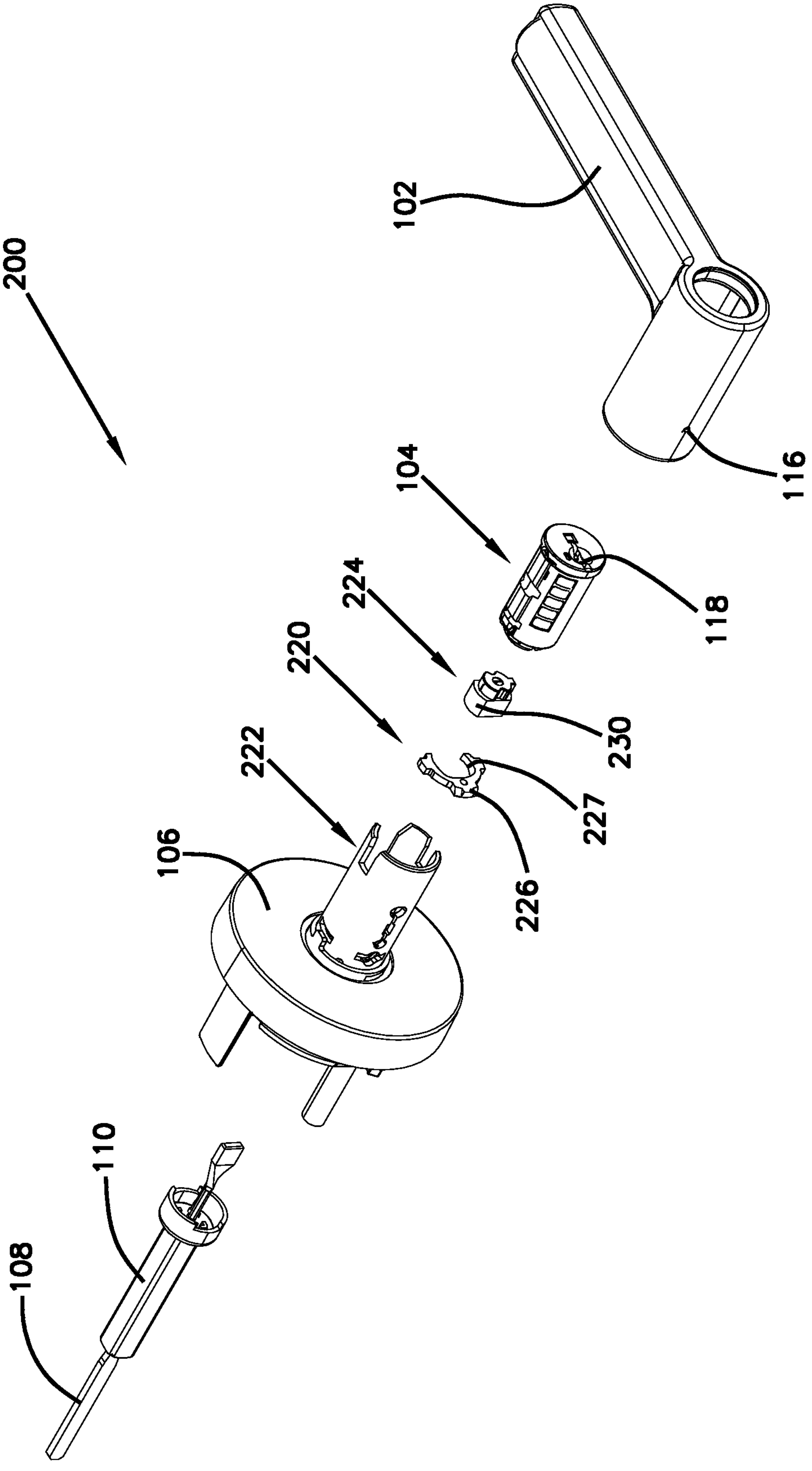
FIG. 11 illustrates a partial exploded view of a handle assembly, according to one embodiment of the present disclosure.

FIG. 11 shows a partially exploded view of a handle assembly 200, according to another embodiment of the present disclosure. The handle assembly 200 is substantially similar to the handle assembly 100 described above. However, a catch 220, a sleeve 222, a support structure 230, and a spindle connector 224 of the lock core 104 are configured different than what is described above with respect to the handle assembly 100. Specifically, the support structure 230 is integral with the spindle connector 224 of the lock core 104.

The catch 220 is substantially similar to the catch 120 and helps to retain the handle 102 on the sleeve 222 when the catch 220 is in an extended position. The catch 220 further allows removal of the handle 102 from the sleeve 222 when the catch 220 is in a retracted position. In the depicted embodiment, the catch 220 includes an aperture 227 configured to receive the support surface 230 of the spindle connector 224. In some examples, the spindle 108 is also positioned within the aperture 227. In some examples, the aperture 227 of the catch 220 is open at the side opposite a projection 226 of the catch 220.

The sleeve 222 is substantially similar to the sleeve 122 described above. In some examples, the sleeve 222 does not include a support structure disposed at an interior 234. In some examples, the sleeve 222 does include a support structure substantially similar to support structure 130 at the interior 234 of the sleeve 222.

The spindle connector 224 is substantially similar to the spindle connector 124 described above. The spindle connector 224 is configured to be in communication with the lock core 104 and the spindle 108 to facilitate the locking/unlocking of the spindle 108. The spindle connector 224 includes the support surface 230 that is configured to support the catch 220 when in a first position, thereby preventing movement of the catch 220.

Figure 12:
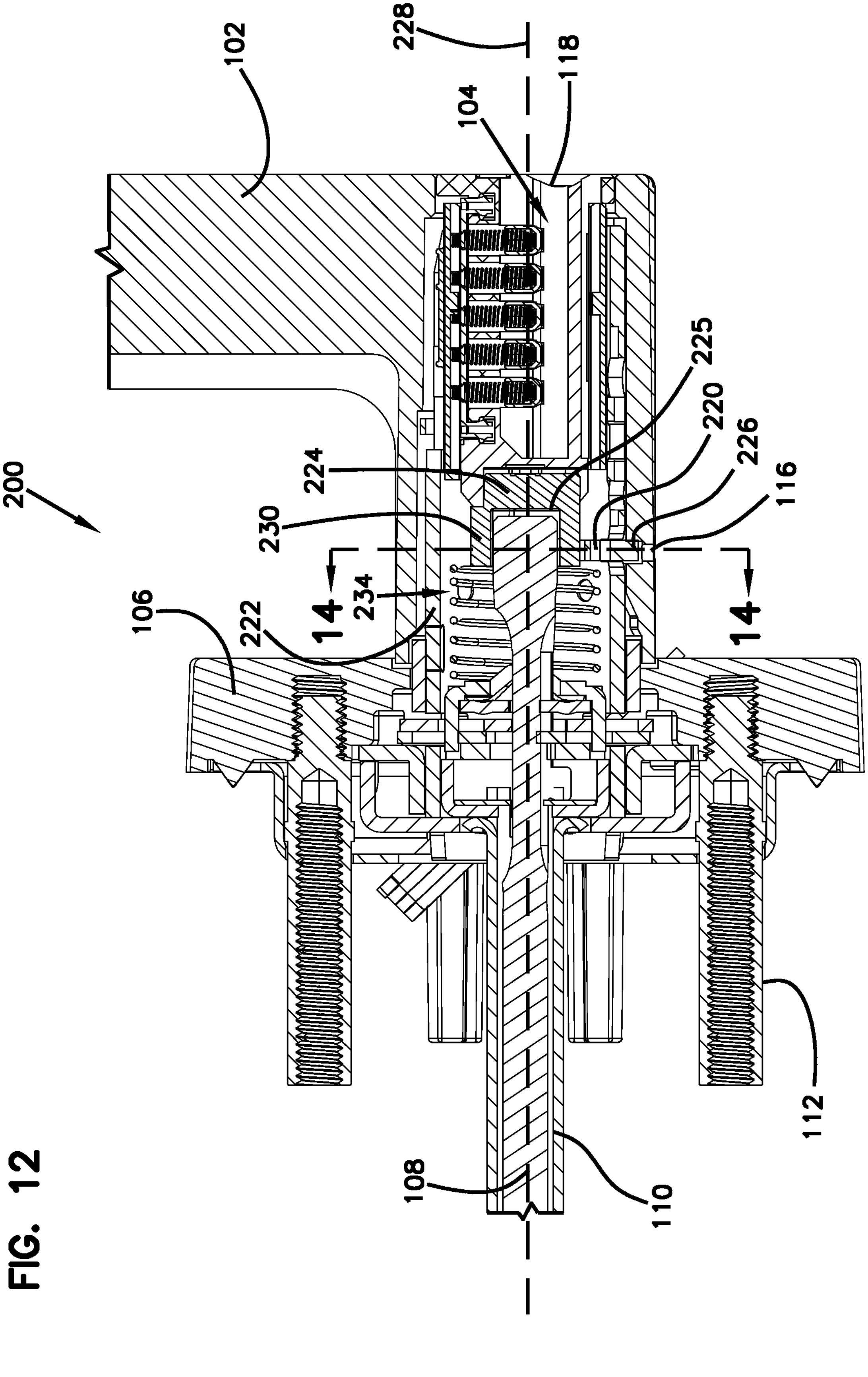
FIG. 12 illustrates a longitudinal cross sectional view of the handle assembly of FIG. 11 with the spindle in the locked position.

FIG. 12 shows a longitudinal cross section of the handle assembly 200. As shown, the spindle 108 is in the locked position, the catch 220 is in the extended position, and the spindle connector 224 is in the first position. In some examples, the lock core 104 is either locked or unlocked. The spindle connector is configured to resist movement of the catch 220 to the retracted position, in a direction transverse to the longitudinal axis 228.

Figure 13:
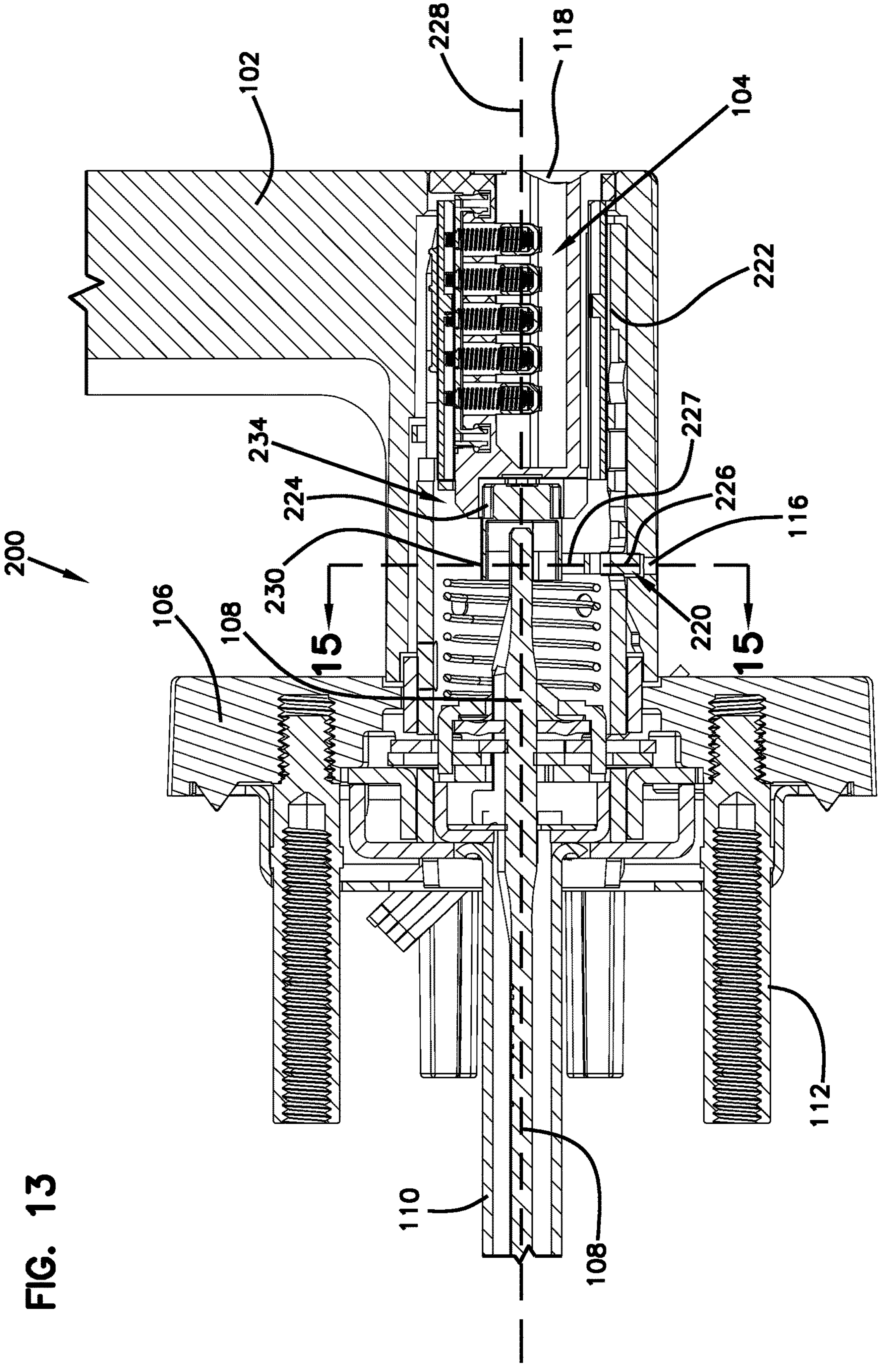
FIG. 13 illustrates a longitudinal cross sectional view of the handle assembly of FIG. 11 with the spindle in the unlocked position.

FIG. 13 shows a longitudinal cross section of the handle assembly 200. As shown, the spindle 108 is in the unlocked position, the catch 220 is in the extended position, and the spindle connector 224 is in a second position. Further, the lock core 104 is unlocked. Because the spindle connector 224 is in the second position, which is a rotated position from the first position, the catch 220 can move to the retracted position when a force is received at the projection 226 of the catch 220.

In the depicted embodiment, the spindle connector 224 is always in the first position when a key is not positioned/rotated in the keyway 118 of the lock core 104. Therefore, regardless of whether or not the lock core 104 is unlocked or locked, the spindle connector 224 will be in the first position. When a valid key is inserted into the keyway 118 and rotated, the spindle connector 224 will rotate to the second position, thereby allowing the user to move the catch 220 to the retracted position, and remove the handle 102 from the sleeve 222. In some examples, the key will need to be held rotated while the catch 220 is moved to the retracted position.

Figure 14:
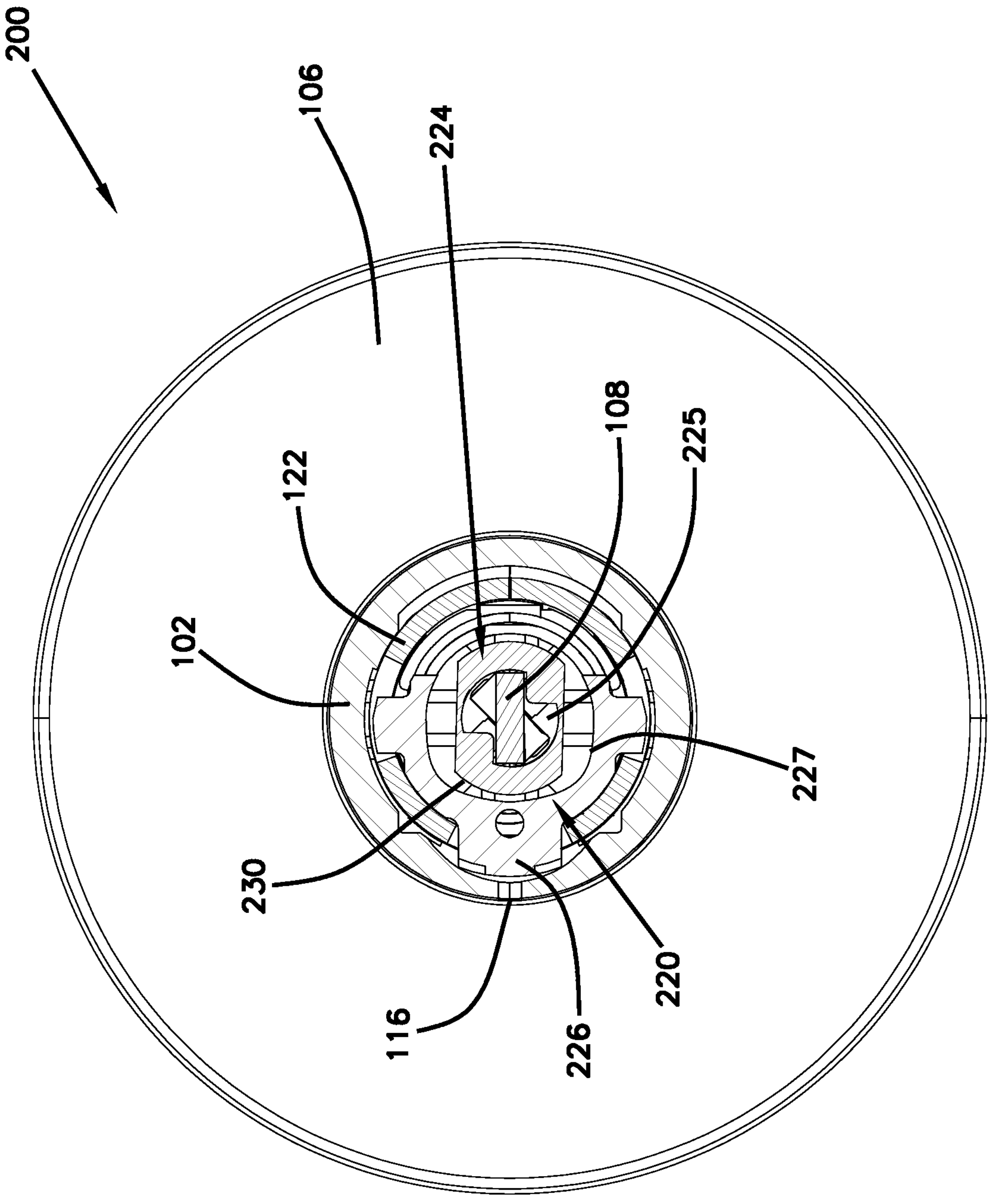
FIG. 14 illustrates a cross sectional view of the handle assembly along the line 14-14 in FIG. 12 with the spindle in the locked position.

FIG. 14 shows a cross-sectional view along line 14-14 of FIG. 12. As shown, the spindle 108 is received and positioned in a recess 225 of the spindle connector 224. The recess 225 is configured so that the spindle connector 224 only transfers a portion of its rotation to the spindle 108 when rotated.

As shown, the spindle 108 is in the locked position, the catch 220 is in the extended position, and the spindle connector 224 is in the first position. Because the support surface 230 has an oblong cross-section, when in the first position, the support surface supports the catch 220 so as to resist movement of the catch 220 to the retracted position, thereby preventing movement of the spindle 108 in the transverse direction with respect to the longitudinal axis 228. In some examples, the support surface 230 is the exterior surface of the spindle connector 224. In some examples, the support surface 230 is a portion of the exterior surface of the spindle connector.

Figure 15:
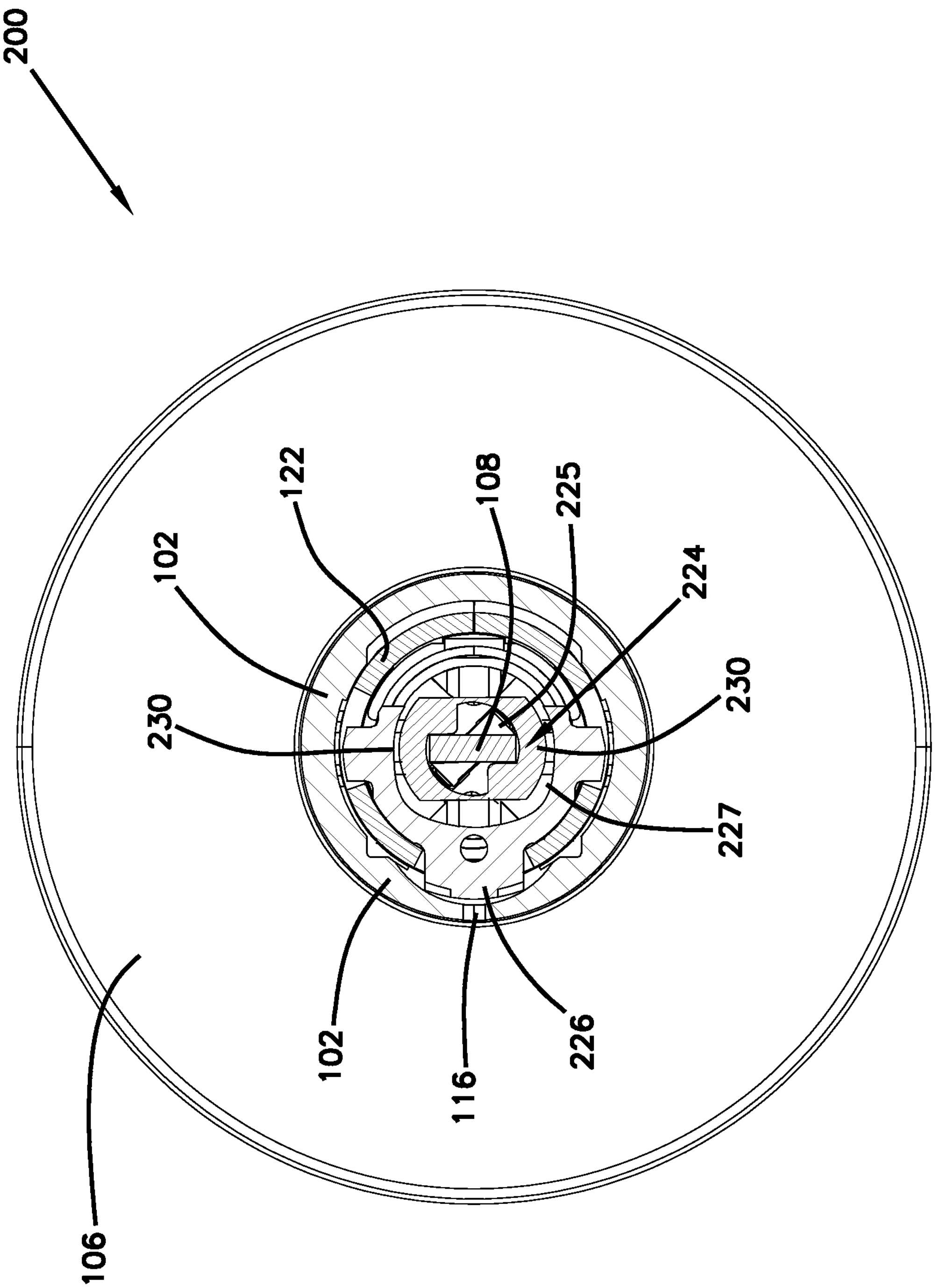
FIG. 15 illustrates a cross sectional view of the handle assembly along the line 15-15 in FIG. 13 with the spindle in the unlocked position.

FIG. 15 shows a cross-sectional view along line 15-15 of FIG. 13. As shown, the spindle 108 is received in a recess 225 of the spindle connector 224. As shown, the spindle 108 is in the unlocked position, the catch 220 is in the extended position, and the spindle connector 224 is in the second position. Because the support surface 230 has an oblong cross-section, when in the second position, the support surface 230 is positioned within the aperture 227 of the catch 220 so as to allow the catch 220 to move to the retracted position.

Figure 17:
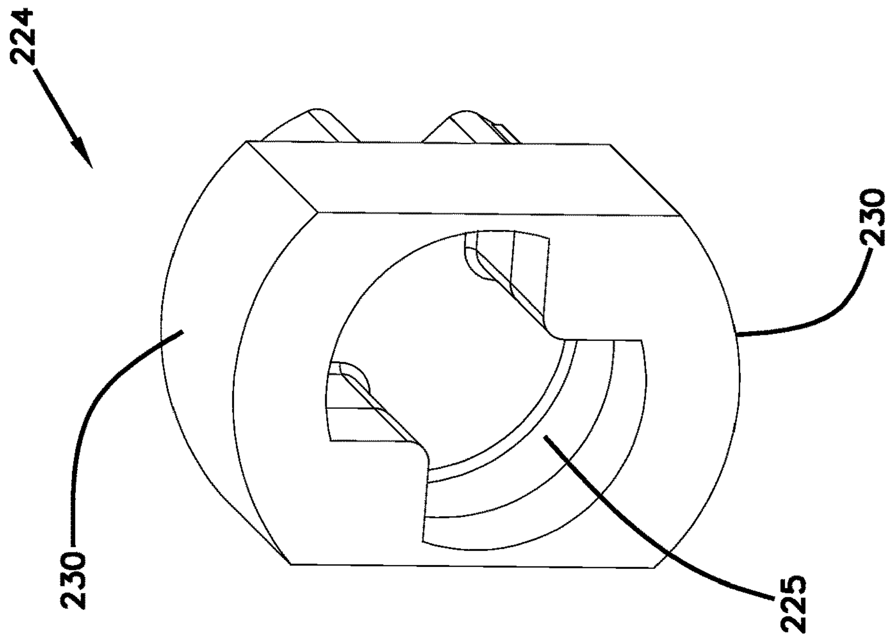
FIG. 17 illustrates another perspective view of a spindle connector of the handle assembly FIG. 11.
Figure 16:
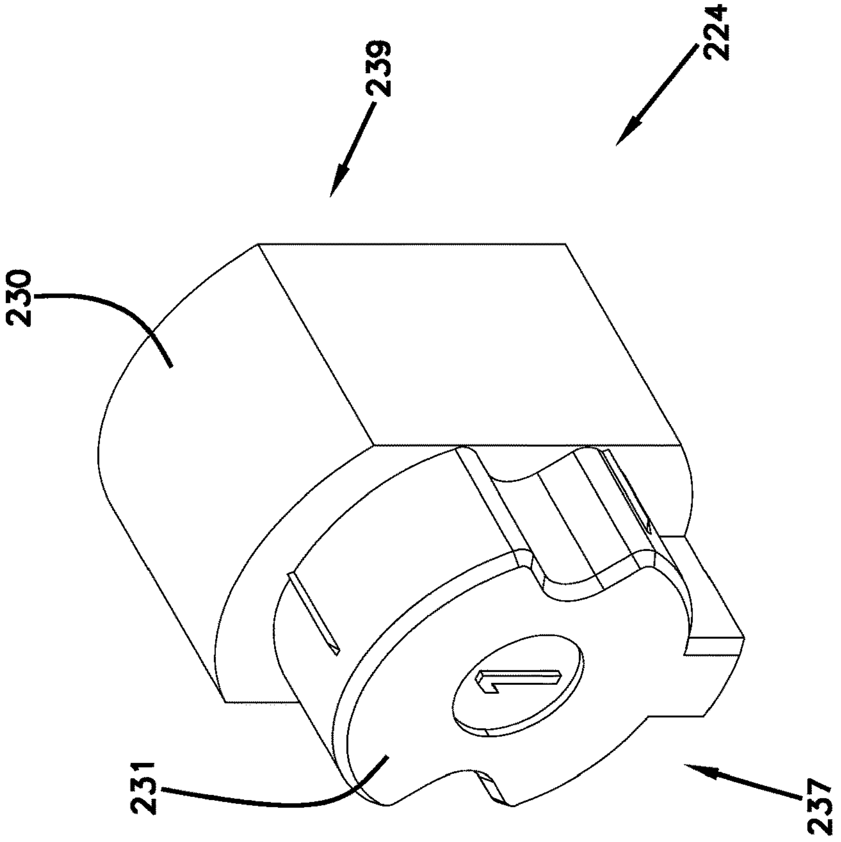
FIG. 16 illustrates a perspective view of a spindle connector of the handle assembly FIG. 11.
Figure 19:
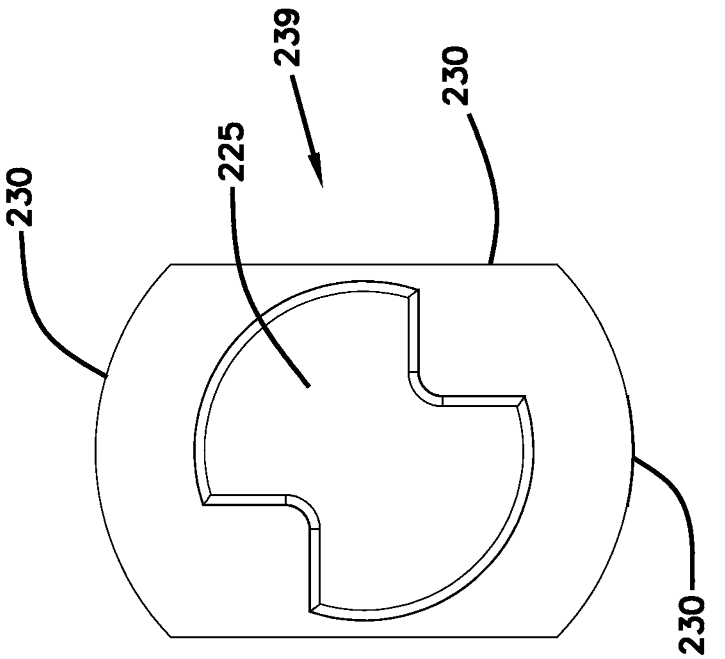
FIG. 19 illustrates another end view of a spindle connector of the handle assembly FIG. 11.
Figure 18:
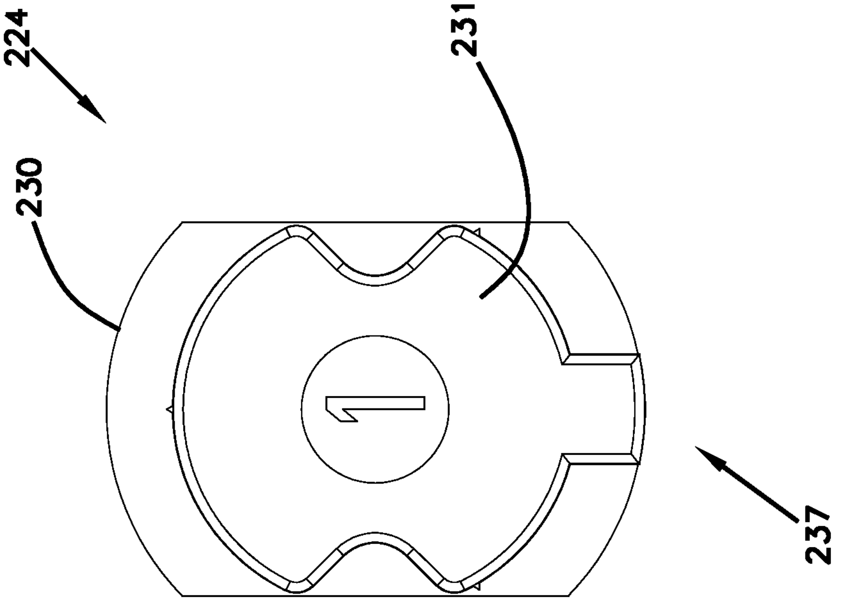
FIG. 18 illustrates an end view of a spindle connector of the handle assembly FIG. 11.

FIGS. 16 and 17 show perspective views of the spindle connector 224. The spindle connector 224 includes a first end 237 and a second end 239. FIG. 18 shows an end view of the first end 237 of the spindle connector 224, and FIG. 19 shows an end view of the second end 239 of the spindle connector 224.

At the first end 237, the spindle connector 224 is configured to mate with the lock core 104 so that rotation of a portion of the lock core 104 by a key in the keyway 118 is transferred to the spindle connector 224. In some examples, the first end 237 includes a projection 231 to mate with the lock core 104

The recess 225 is at the second end 239 of the spindle connector 224. The recess 225 can be configured in a variety of ways to transfer some, or all, of the rotation received from the lock core 104 to the spindle 108.

The support surface 230 is shown to be an exterior portion of the spindle connector 224. As mentioned above, in some examples, the second end 239 of the spindle connector 224 can have an oblong cross-section. In some example, the second end 239 can have a rectangular cross section. In some examples, the second end 239 can have a configuration where a cross sectional width of the second end 239 is smaller than the opposite, cross-sectional length. In some examples, the support surface 230 includes a curved surface, as shown.

Figure 20:
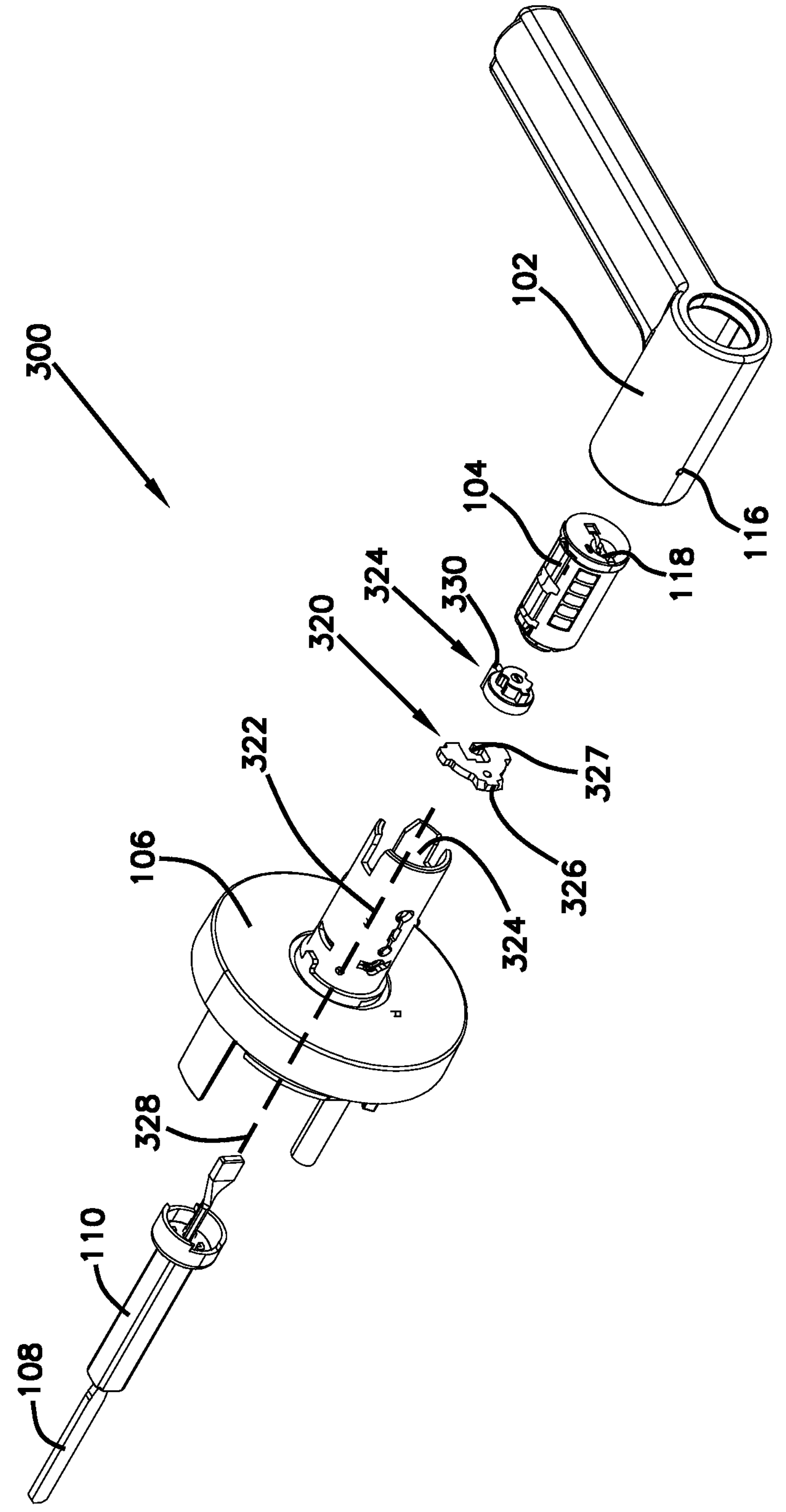
FIG. 20 illustrates a partial exploded view of a handle assembly, according to one embodiment of the present disclosure.

FIG. 20 shows a partially exploded view of a handle assembly 300, according to another embodiment of the present disclosure. The handle assembly 300 is substantially similar to the handle assemblies 100, 200 described above. However, a catch 320, a sleeve 322, a support structure 330, and a spindle connector 324 of the lock core 104 are configured differently than that the what is described above with respect to the handle assemblies 100, 200. Like in handle assembly 200, the support structure 330 is integral with the spindle connector 324 of the lock core 104.

The catch 320 is substantially similar to the catches 120, 220 and helps to retain the handle 102 ion the sleeve 322 when the catch 320 is in an extended position. The catch 320 further allows removal of the handle 102 from the sleeve 322 when the catch 320 is in a retracted position. In the depicted embodiment, the catch 320 includes an aperture 327 configured to receive the spindle 108. In some examples, the aperture 327 of the catch 320 is open at the side opposite a projection 326 of the catch 320.

The sleeve 322 is substantially similar to the sleeves 122, 222 described above. In some examples, the sleeve 322 does not include a support structure disposed at an interior 334. In some examples, the sleeve 322 does include a support structure substantially similar to support structure 130 at the interior 334 of the sleeve 322.

The spindle connector 324 is substantially similar to the spindle connectors 124, 224 described above. The spindle connector 324 is configured to be in communication with the lock core 104 and the spindle 108 to facilitate the locking/unlocking of the spindle 108. The spindle connector 324 includes the support surface 330 that is configured to support the spindle 108 when in a first position, thereby preventing unwanted movement of the spindle transverse to a longitudinal axis 328.

Figure 21:
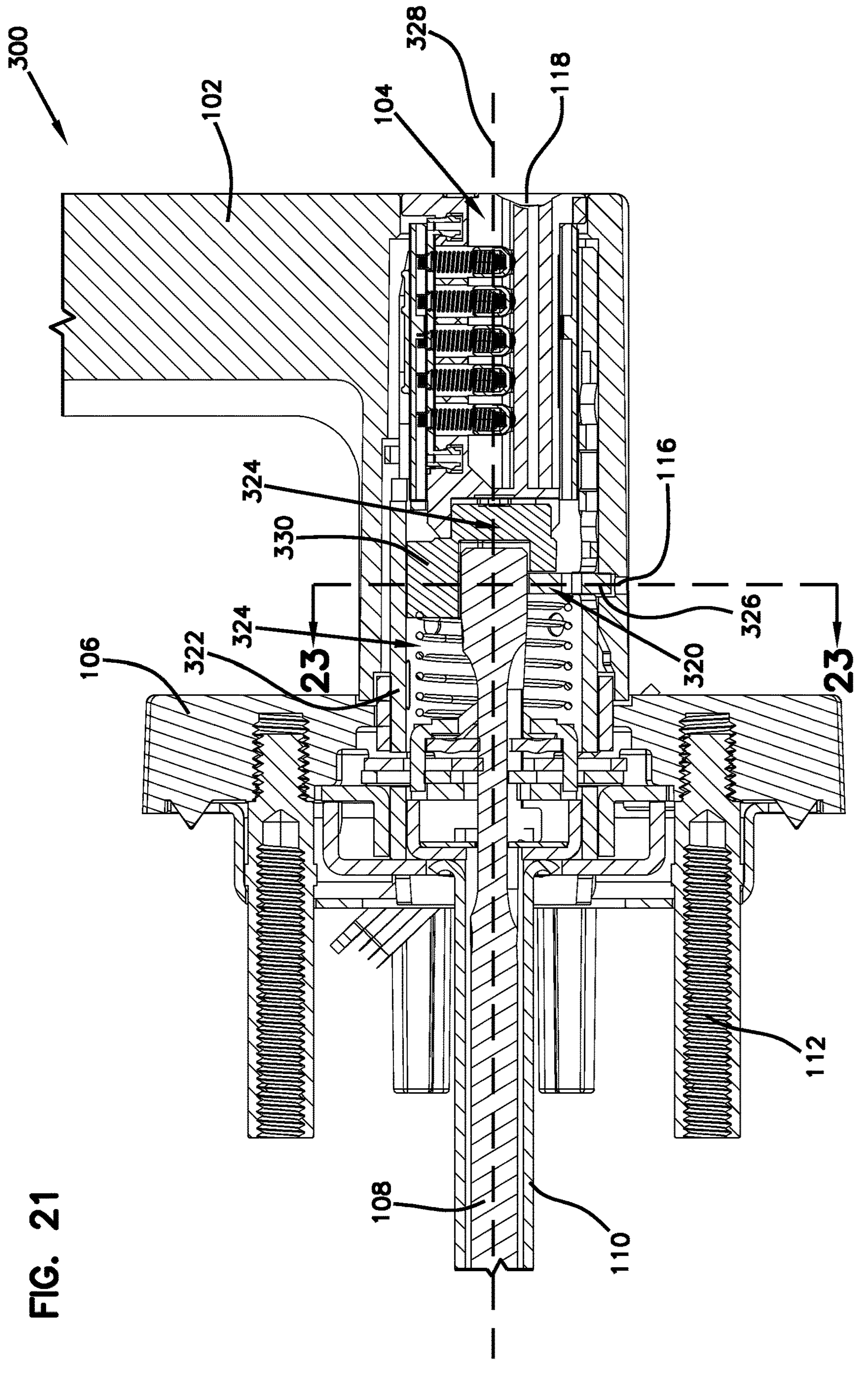
FIG. 21 illustrates a longitudinal cross sectional view of the handle assembly of FIG. 20 with the spindle in the locked position.

FIG. 21 shows a longitudinal cross section of the handle assembly 300. As shown, the spindle 108 is in the locked position, the catch 320 is in the extended position, and the spindle connector 324 is in the first position. In some examples, the lock core 104 is either locked or unlocked. When in the first position, the spindle connector 324, resists movement of the catch 320 to the retracted position by using the support surface 330 to support the spindle 108 and prevent movement of the spindle 108 in a direction transverse to the longitudinal axis 328.

Figure 22:
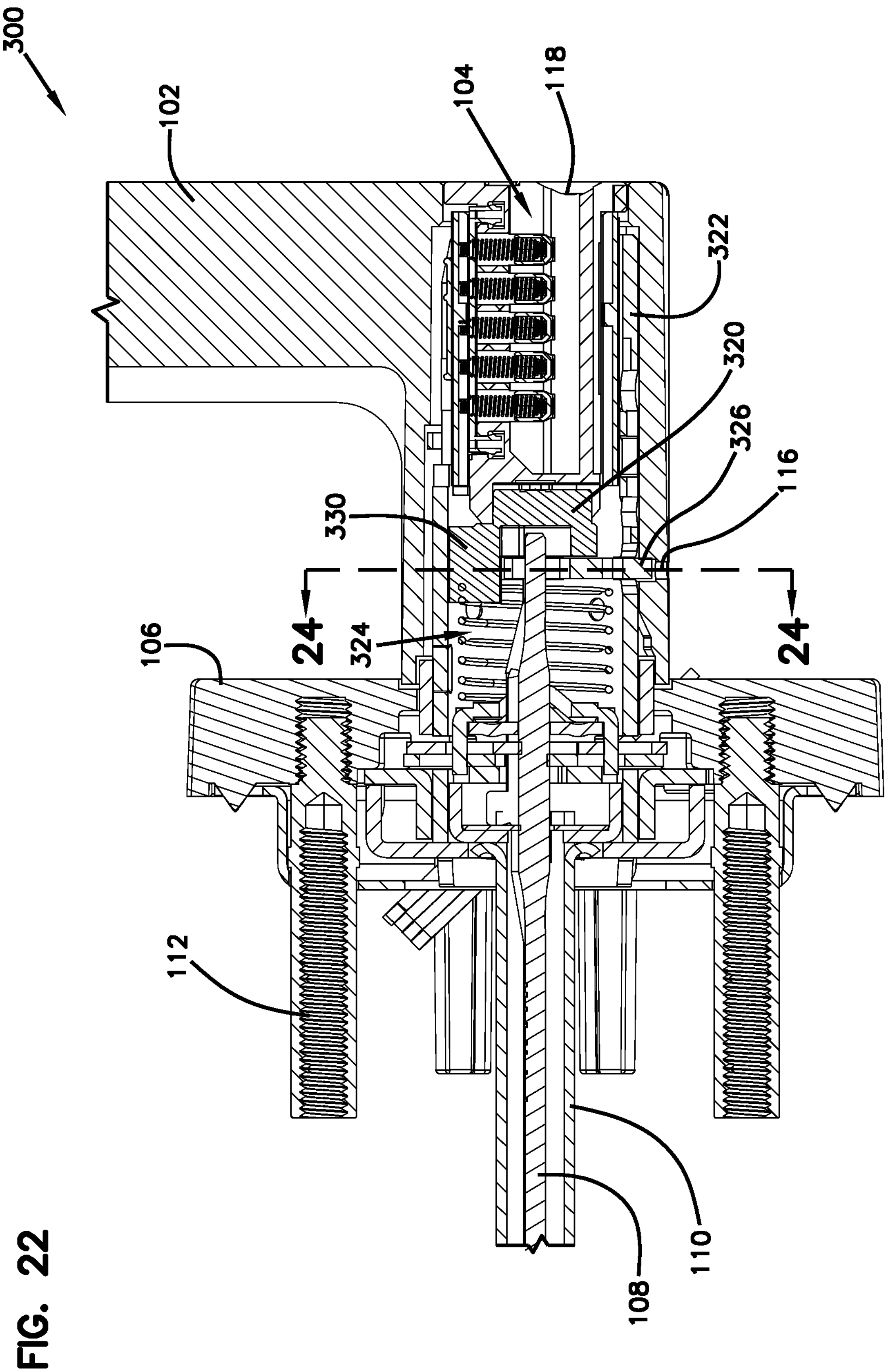
FIG. 22 illustrates a longitudinal cross sectional view of the handle assembly of FIG. 20 with the spindle in the unlocked position.

FIG. 22 shows a longitudinal cross section of the handle assembly 300. As shown, the spindle 108 is in the unlocked position, the catch 320 is in the extended position, and the spindle connector 324 is in the first position. Further, the lock core 104 has been unlocked. Because the spindle 108 has been rotated to the unlocked position, the spindle is no longer supported by the support surface 330 and the catch 320 can move to the retracted position when a force is received at the projection 326 of the catch 320.

In the depicted embodiment, the spindle connector 324 is always in the first position when a key is not positioned/rotated in the keyway 118 of the lock core 104. Therefore, regardless of whether or not the lock core 104 is unlocked or locked, the spindle connector 324 will be in the first position. When a valid key is inserted into the keyway 118 and rotated, the spindle connector 324 will rotate to a second position. However, unlike handle assembly 200, because the support surface 330 supports the spindle 108, and not the catch 320 directly, a valid key will not need to be inserted and rotated in the keyway 118 in order to remove the handle 102 from the sleeve 322. The spindle 108 will only need to be in the unlocked position to allow the catch 320 to be moved to the retracted position.

Figure 23:
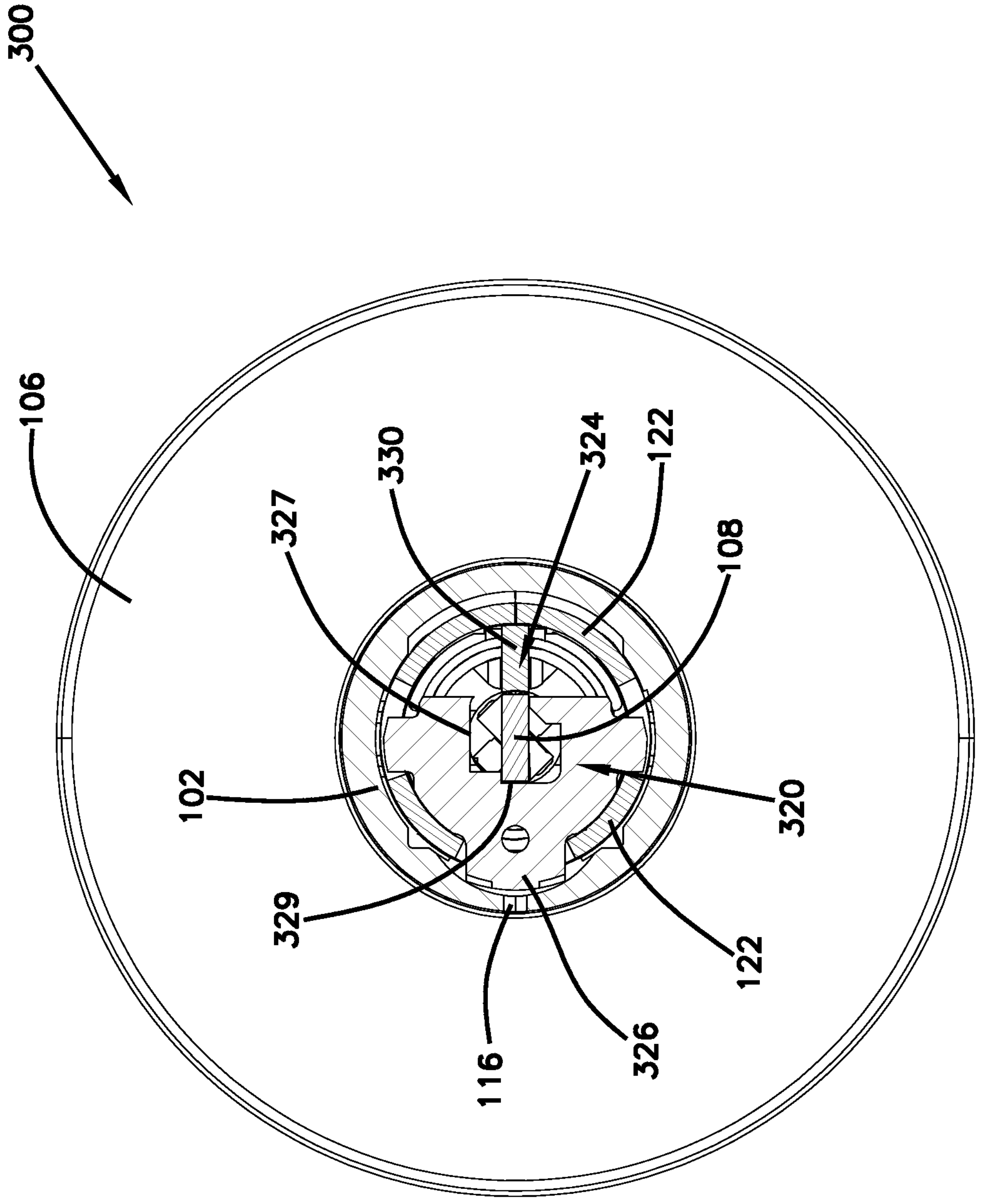
FIG. 23 illustrates a cross sectional view of the handle assembly along the line 23-23 in FIG. 22 with the spindle in the locked position.

FIG. 23 shows a cross-sectional view along line 23-23 of FIG. 21. As shown, the spindle 108 is received and positioned within the aperture 327 of the catch 320. As shown, the spindle 108 is in the locked position, the catch 320 is in the extended position, and the spindle connector 324 is in the first position. Because the support surface 330 is aligned within the spindle 108, movement of the catch 320 is resisted by the fact that the spindle 108 is positioned directly between a bearing surface 329 of the aperture 327 of the catch 320 and the support surface 330. Because of this alignment, movement of the spindle 108 in the transverse direction with respect to the longitudinal axis 228 is prevented.

Figure 24:
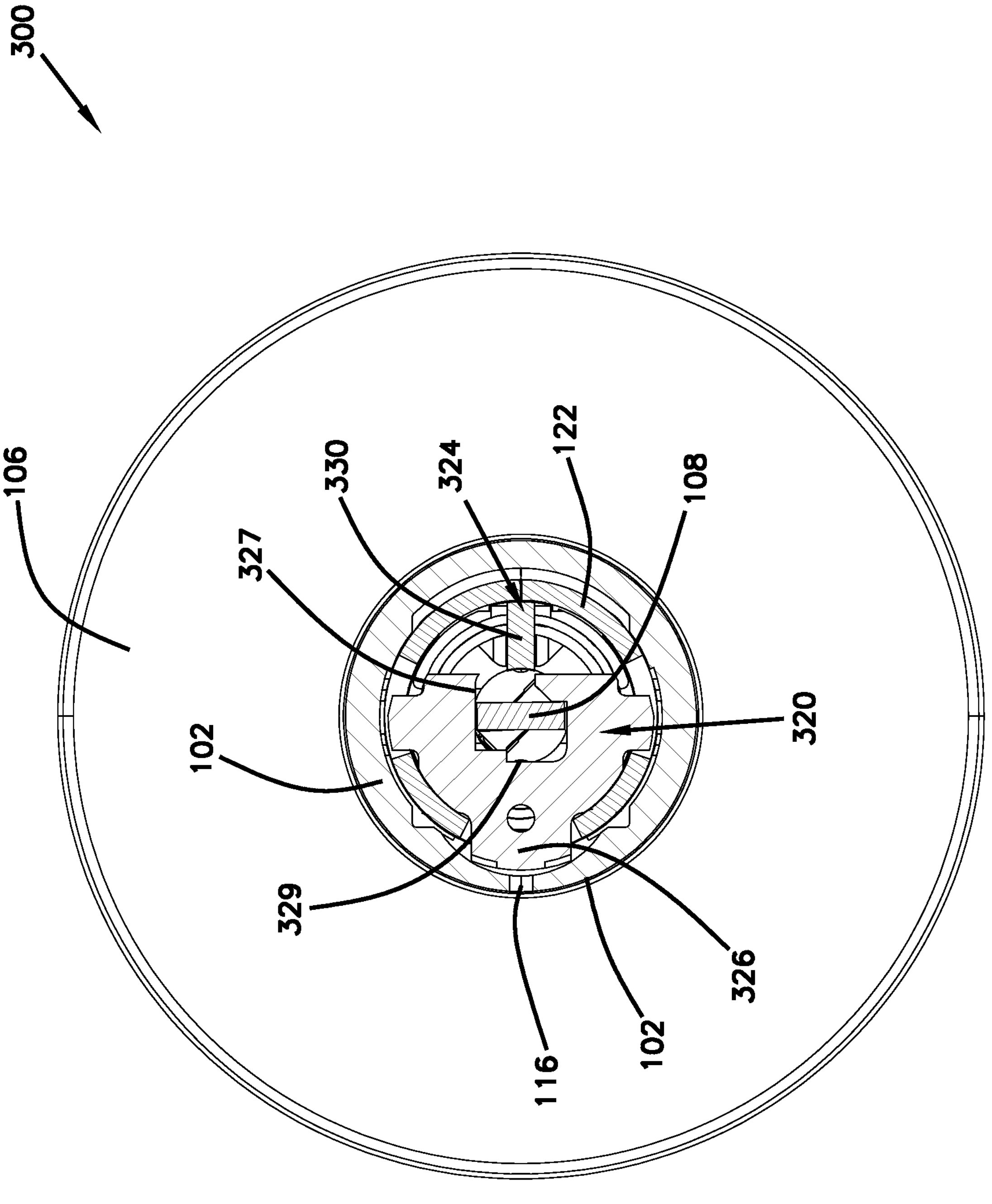
FIG. 24 illustrates a cross sectional view of the handle assembly along the line 24-24 in FIG. 21 with the spindle in the unlocked position.

FIG. 24 shows a cross-sectional view along line 24-24 of FIG. 22. As shown, the spindle 108 is in the unlocked position, the catch 320 is in the extended position, and the spindle connector 324 is in the first position. Because the support surface 330 is misaligned with the spindle 108, the catch 320 can move to the retracted position.

Figure 26:
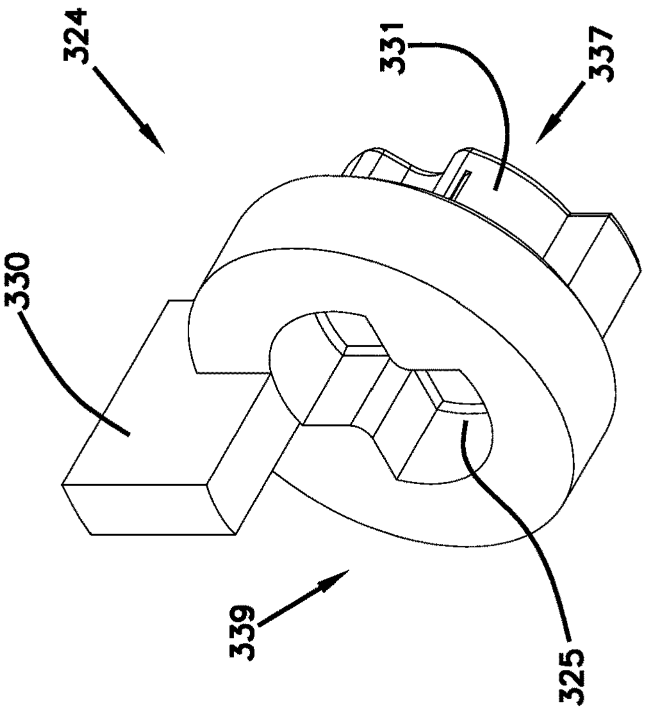
FIG. 26 illustrates another perspective view of a spindle connector of the handle assembly FIG. 20.
Figure 25:
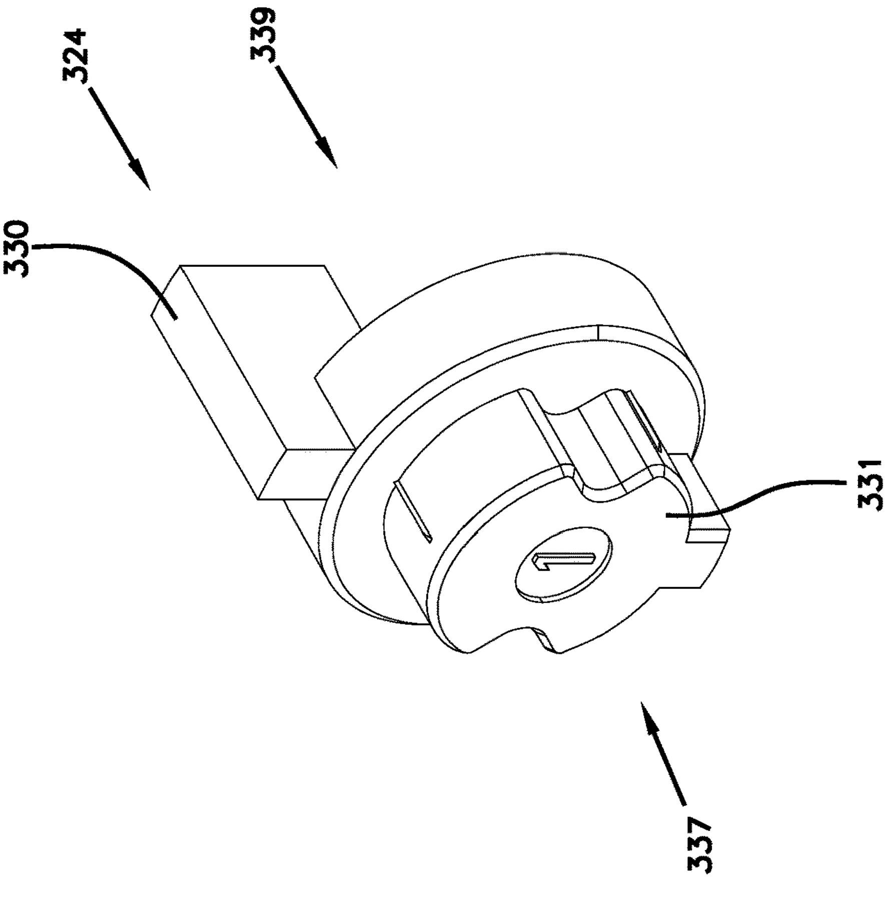
FIG. 25 illustrates a perspective view of a spindle connector of the handle assembly FIG. 20.
Figure 27:
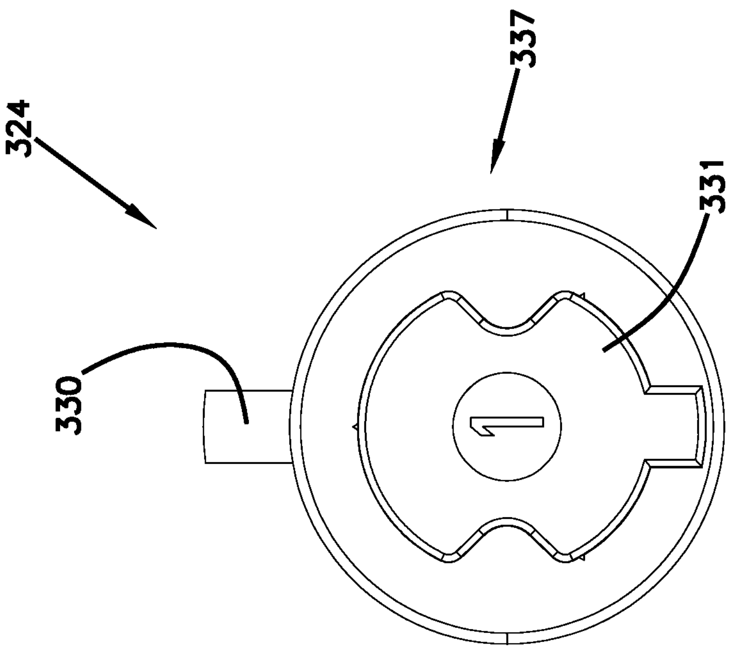
FIG. 27 illustrates an end view of a spindle connector of the handle assembly FIG. 20.
Figure 28:
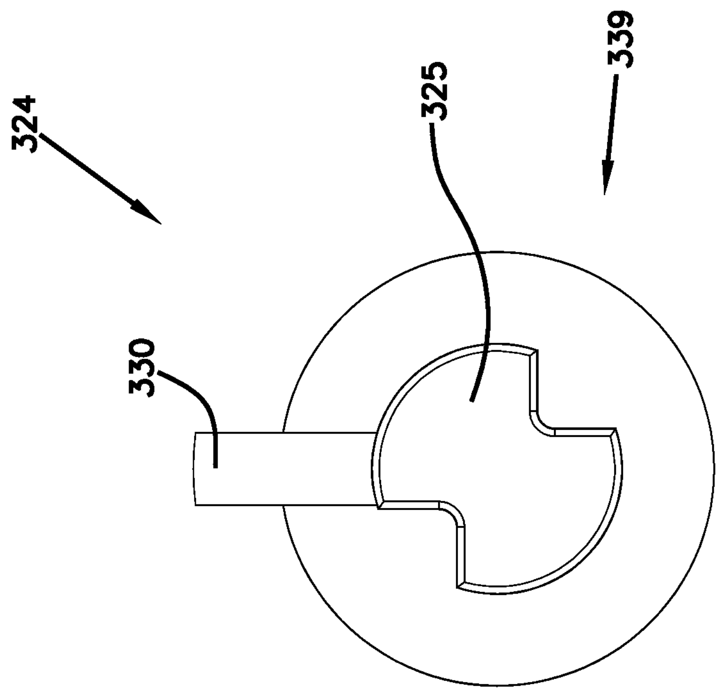
FIG. 28 illustrates another end view of a spindle connector of the handle assembly FIG. 20.
Figure 30:
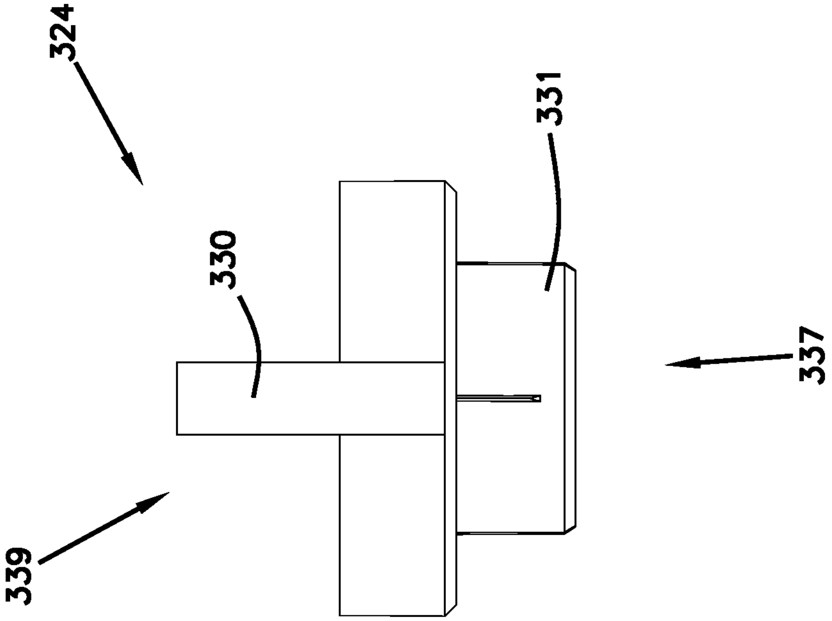
FIG. 30 illustrates another side view of a spindle connector of the handle assembly FIG. 20.
Figure 29:
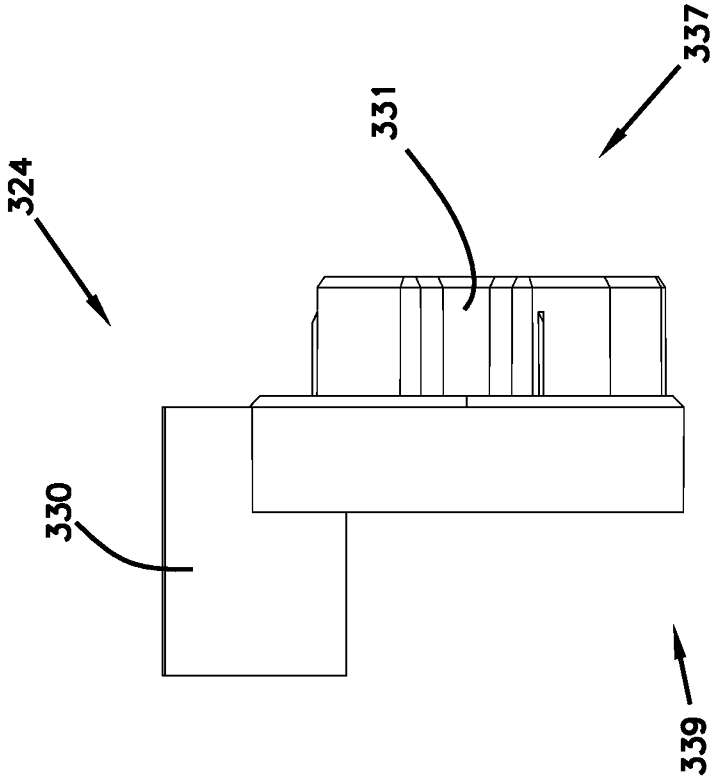
FIG. 29 illustrates a side view of a spindle connector of the handle assembly FIG. 20.

FIGS. 25 and 26 show perspective views of the spindle connector 324. The spindle connector 324 includes a first end 337 and a second end 339. FIG. 27 shows an end view of the first end 337 of the spindle connector 324, and FIG. 28 shows an end view of the second end 339 of the spindle connector 324. FIG. 29 shows a side view of the spindle connector 324, and FIG. 30 shows a top view of the spindle connector 324.

At the first end 337, the spindle connector 324 is configured to mate with the lock core 104 so that rotation of a portion of the lock core 104 by a key in the keyway 118 is transferred to the spindle connector 324. In some examples, the first end 337 includes a projection 331 to mate with the lock core 104

A recess 325 is at the second end 339 of the spindle connector 324. The recess 325 can be configured in a variety of ways to transfer some, or all, of the rotation received from the lock core 104 to the spindle 108.

The support surface 330 is shown to be an exterior portion of the spindle connector 324. In some examples, the support surface 330 is a radial projection at the second end 339. In some examples, the radial projection is a tab.

Portions of the locking handle can a variety of different configurations. In some examples, the sleeve, catch, and spindle connector can all include support surfaces, such as those disclosed herein. In other examples, more than one of the sleeve, catch, and spindle connector can include a support surface. In some examples, both the catch and the spindle can be supported with support surfaces. With regard to the support surfaces disclosed herein, all support surfaces are formed into portions of the handle assembly that are needed for other functions of the handle assembly, such as the sleeve and/or the spindle connector. This prevents the need for a separate part to support the spindle and/or catch, thus being more cost effective.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A handle assembly comprising:

a removable handle including a positioning hole;

a lock core positioned within the handle;

a sleeve sized and shaped to receive the handle therearound and the lock core at least partially therein, wherein the sleeve includes a cylindrical wall defining an interior of the sleeve, and the sleeve defining a sleeve axis;

a catch positioned within the sleeve, the catch having an extended position and a retracted position, wherein when in the extended position, a protrusion of the catch interfaces with a portion of the positioning hole of the handle so as to prevent relative movement between the handle and the sleeve, and when in the retracted position, the handle is movable relative to the sleeve;

a spindle positioned within the sleeve and connected to the lock core, the spindle having a longitudinal axis, wherein the spindle is rotatable by the lock core between a locked position and an unlocked position, wherein when in the locked position, the sleeve is not rotatable, and wherein when in the unlocked position, the sleeve is rotatable; and a support structure configured to support the spindle, wherein the support structure is in a fixed rotational relationship with respect to the handle, wherein the support structure extends from the cylindrical wall into the interior of the sleeve without any portion projecting outwardly from the cylindrical wall, the support structure including a tab having a proximal end extending from the cylindrical wall and a distal end disposed within the interior of the sleeve, the proximal end having a circumferential length relative to the sleeve axis that is greater than the distal end, the tab having sidewalls extending between the proximal and distal ends that are oriented radially relative to the sleeve axis, wherein the support structure is integral with the sleeve, and wherein, when the catch is in the extended position and the spindle is in the locked position, deflection of the spindle in a direction transverse to the longitudinal axis is resisted by way of the support structure.

2. The handle assembly of claim 1, wherein movement of the catch toward the retracted position is prevented by way of the support structure.

3. The handle assembly of claim 1, wherein the support structure is a blocking element of the sleeve, wherein the blocking element is aligned with a movement plane within which the catch is movable.

4. The handle assembly of claim 1, wherein the support structure resists deflection of the spindle when the spindle is in the locked position.

5. The handle assembly of claim 1, wherein the spindle is at least partially supported by a bearing surface of the catch.

6. The handle assembly of claim 1, wherein the spindle is not supported by the catch.

7. The handle assembly of claim 1, wherein said support structure is not a ring having a center hole disposed at the center of the ring and provided for passing the spindle.

8. The handle assembly of claim 1, wherein the handle is at least one of a knob or lever.

9. The handle assembly of claim 3, wherein the blocking element is the tab positioned within the sleeve and positioned generally transverse to the sleeve axis of the sleeve.

10. The handle assembly of claim 3, wherein the blocking element is monolithically formed with the cylindrical wall of the sleeve.

11. A method of increasing the security of a handle assembly, the method comprising:

providing a handle assembly including:

a removable handle including a positioning hole;

a lock core positioned within the handle;

a spindle connector connected to the lock core, the spindle connector having a first end with an axially extending projection and a second end with an axially extending recess, the projection of the first end mated with the lock core such that rotation is transferred from the lock core to the spindle connector;

a sleeve sized and shaped to receive the handle therearound and the lock core at least partially therein;

a catch positioned within the sleeve, the catch having an extended position and a retracted position, wherein when in the extended position, a protrusion of the catch interfaces with a portion of the positioning hole of the handle so as to prevent relative movement between the handle and the sleeve, and when in the retracted position, the handle is movable relative to the sleeve;

a spindle positioned within the sleeve and connected to the lock core via the recess of the second end of the spindle connector, the spindle having a longitudinal axis, wherein the spindle is rotatable by the lock core between a locked position and an unlocked position, wherein when in the locked position, the sleeve is not rotatable and wherein when in the unlocked position, the sleeve is rotatable; and resisting deflection of the spindle transverse to the longitudinal axis of the spindle by way of a support structure when the catch is in the extended position and the spindle is in the locked position, wherein the support structure is movable with respect to the spindle, and wherein the support structure is in a fixed rotational relationship with respect to the handle, and wherein the support structure is integral with a blocking element of the second end of the spindle connector, and wherein the blocking element has the recess defined therein and the support structure is a radially exterior surface of the blocking element that forms an outermost surface of the second end of the spindle connector.

12. The method of claim 11, wherein movement of the catch toward the retracted position is resisted by the support structure.

13. The method of claim 11, further comprising resisting deflection of the spindle when the spindle is in the locked position.

14. The method of claim 11, further comprising at least partially supporting the spindle by way of a bearing surface of the catch.

15. The method of claim 11, wherein the spindle is not supported by the catch.

16. The method of claim 11, wherein the support structure is not a ring having a center hole disposed at the center of the ring and provided for passing the spindle.

17. A handle assembly comprising:

a removable handle including a positioning hole;

a lock core positioned within the handle, wherein the lock core includes a keyway at a first side;

a spindle connector coupled to an opposite, second side of the lock core, the spindle connector having a first end with an axially extending projection and a second end with an axially extending recess, the projection of the first end mated with the lock core such that rotation is transferred from the lock core to the spindle connector;

a sleeve sized and shaped to receive the handle therearound and the lock core at least partially therein;

a catch positioned within the sleeve, the catch having an extended position and a retracted position, wherein when in the extended position, a protrusion of the catch interfaces with a portion of the positioning hole of the handle so as to prevent relative movement between the handle and the sleeve, and when in the retracted position, the handle is movable relative to the sleeve;

a spindle positioned within the sleeve and connected to the recess of the second end of the spindle connector of the lock core, wherein the spindle is rotatable by the lock core between a locked position and an unlocked position, wherein when in the locked position, the sleeve is not rotatable, and wherein when in the unlocked position, the sleeve is rotatable; and a support structure configured to resist deflection of the spindle transverse to a longitudinal axis of the spindle when the catch is in the extended position and the spindle is in the locked position, wherein the support structure is integral with a blocking element of the second end of the spindle connector, and wherein the blocking element has the recess defined therein and the support structure is a radially exterior surface of the blocking element that forms an outermost surface of the second end of the spindle connector. of the sleeve or the spindle connector of the lock core.

18. The handle assembly of claim 17, wherein the blocking element has an oval, oblong, or rectangular cross-section.

19. The handle assembly of claim 17, wherein the radially exterior surface is configured to support the spindle at an opposite side than the side at which the catch is positioned.

20. The handle assembly of claim 18, wherein the radially exterior surface is curved.

21. The handle assembly of claim 17, wherein the radially exterior surface is a radially projecting structure in the form of a tab.

* * * * *